(12) United States Patent
Lobisser et al.

(10) Patent No.: US 11,974,523 B2
(45) Date of Patent: May 7, 2024

(54) ATMOSPHERE AND OR ATMOSPHERE COMPOSITION CONTROL IN VACUUM CHAMBER METHOD, SYSTEM, AND APPARATUS

(71) Applicant: Ripelocker LLC, Bainbridge Island, WA (US)

(72) Inventors: George Frank Lobisser, Bainbridge Island, WA (US); G. Kyle Lobisser, Bainbridge Island, WA (US); Andrew B. Harrah, Bainbridge Island, WA (US); Eric Levi, Bainbridge Island, WA (US); David Shock, Bainbridge Island, WA (US)

(73) Assignee: RIPELOCKER LLC, Bainbridge Island, WA (US)

( * ) Notice: Subject to any disclaimer, the term of this patent is extended or adjusted under 35 U.S.C. 154(b) by 920 days.

(21) Appl. No.: 16/893,121

(22) Filed: Jun. 4, 2020

(65) Prior Publication Data

US 2020/0385205 A1   Dec. 10, 2020

Related U.S. Application Data

(60) Provisional application No. 62/857,451, filed on Jun. 5, 2019.

(51) Int. Cl.
*A01F 25/00* (2006.01)
*A23B 7/152* (2006.01)
*A23L 3/00* (2006.01)
*A23L 3/3445* (2006.01)

(52) U.S. Cl.
CPC .............. *A01F 25/00* (2013.01); *A23B 7/152* (2013.01); *A23L 3/003* (2013.01); *A23L 3/3445* (2013.01)

(58) Field of Classification Search
CPC ....... A01F 25/00; A23B 7/152; A23L 3/3445; A23L 3/003
USPC ...................... 137/486, 487.5; 53/432, 111 R
See application file for complete search history.

(56) References Cited

U.S. PATENT DOCUMENTS

| | | | |
|---|---|---|---|
| 2,890,810 A | 6/1959 | Rohling | |
| 3,085,913 A | 4/1963 | Caswell | |
| 3,418,783 A | 12/1968 | Collons | |
| RE28,995 E * | 10/1976 | Burg | A23B 7/152 426/419 |
| 4,113,095 A | 9/1978 | Dietz et al. | |
| 4,591,055 A | 5/1986 | Corn | |
| 4,643,314 A | 2/1987 | Kidd | |
| 5,028,443 A | 7/1991 | Wade | |
| 5,111,938 A | 5/1992 | Soprano et al. | |
| 5,261,976 A | 11/1993 | Schultz | |
| 5,450,998 A | 9/1995 | Esse et al. | |
| 5,487,471 A | 1/1996 | Marchek | |

(Continued)

OTHER PUBLICATIONS

Burg, S.P., "Postharvest Physiology Hypobaric Storage Fresh Produce," CABI Publishing, Oxfordshire, UK, ISBN 0851998011, © S.P. Burg 2004. [Relevant portions: entire document.].

*Primary Examiner* — Minh Q Le
(74) *Attorney, Agent, or Firm* — AEON Law, PLLC; Adam L. K. Philipp; James Namiki

(57) ABSTRACT

Methods, apparatus, and system to manage an atmosphere and/or an antimicrobial inside a vacuum chamber or container, including via at least one of valves, sensors, manifold, antimicrobial delivery unit, antimicrobial sachet, vacuum pump, and an atmosphere control.

11 Claims, 8 Drawing Sheets

(56) References Cited

U.S. PATENT DOCUMENTS

| | | | |
|---|---|---|---|
| 5,747,082 A * | 5/1998 | Floyd | A23B 7/0433 |
| | | | 426/118 |
| 6,536,192 B2 | 3/2003 | King et al. | |
| 7,203,574 B2 | 4/2007 | Caci et al. | |
| 7,228,793 B2 * | 6/2007 | Ling | A23B 7/148 |
| | | | 99/476 |
| 8,256,190 B2 * | 9/2012 | Bowden | B65B 55/00 |
| | | | 426/316 |
| 8,783,002 B2 | 7/2014 | Bowden et al. | |
| 10,919,656 B1 * | 2/2021 | Lobisser | B65D 85/34 |
| 2009/0104317 A1 * | 4/2009 | Clarke | B65D 81/2069 |
| | | | 426/316 |
| 2009/0230012 A1 | 9/2009 | Choy et al. | |
| 2010/0200599 A1 | 8/2010 | Molthen et al. | |
| 2013/0156912 A1 | 6/2013 | Espinosa | |
| 2014/0180953 A1 * | 6/2014 | Westcott | A23L 3/3445 |
| | | | 705/332 |
| 2015/0108037 A1 | 4/2015 | Evans et al. | |
| 2018/0310579 A1 * | 11/2018 | Zhang | A23B 7/05 |
| 2020/0113199 A1 * | 4/2020 | Schaefer | A23B 7/152 |
| 2020/0275671 A1 * | 9/2020 | Holm | A23L 3/3445 |
| 2020/0385205 A1 * | 12/2020 | Lobisser | A23B 7/152 |

\* cited by examiner

ATMOSPHERE AND OR ATMOSPHERE COMPOSITION CONTROL IN VACUUM CHAMBER METHOD, SYSTEM, AND APPARATUS

CROSS-REFERENCE TO RELATED APPLICATIONS

The present application is a non-provisional of, claims the benefit of the filing date of, and incorporates by this reference the subject matter of U.S. provisional patent application No. 62/857,451 filed Jun. 5, 2019.

FIELD

The present disclosure relates to methods, apparatuses, and systems to control an atmosphere and/or a composition of an atmosphere in a vacuum chamber, including fungicides in the atmosphere.

BACKGROUND

A problem that has existed since the dawn of agriculture is that, while the human demand for fruits and vegetables exists year-round, the growing season is seasonal. Many perishable commodities, such as fruits, vegetables, flowers, meat and fish can only be grown and/or ripened during specific, typically short, times of the year. Furthermore, such commodities are often grown far from the markets in which they are sold and consumed. The time spent in shipping such perishable commodities reduces the practical time during which the perishable commodities can be sold and consumed. In the case of certain fruits, such as strawberries, blueberries, etc., the time between when the fruit is ripe for harvest and when it begins to spoil is often short. This creates the dual problems of, for example, having too much of a perishable available during the peak of the harvesting season, and too little available during the off, or non-peak seasons. Much effort has, accordingly, been directed toward extending the post-harvest life of fruits, vegetables, flowers, meat, fish and similar perishable commodities ("perishables") intended for human or animal consumption and/or use.

One known technique for extending the post-harvest life of fruits and vegetables involves placing the perishables in a vacuum for storage. It has been determined that holding perishables in a vacuum of between approximately 10 to 150 Torr, potentially in combination with refrigeration, may slow degradation compared to refrigeration alone.

Although the beneficial effects of vacuums on harvested fruit and vegetables are known, many problems exist in using such techniques in actual practice. Prior attempts have included building specialized refrigerated vacuum rooms, large ISO containers and/or large-scale containers for storing the perishable commodities after harvest and before shipment to retailers and consumers. Such rooms and containers have been fabricated from materials such as metal and concrete. Such rooms and containers are large, bulky, immovable, expensive, and attaining and maintaining a desired level of vacuum may not be possible. For example, it may be necessary to operate large vacuum pump(s) continuously to maintain a desired level of vacuum in such a large structure, because large structures are prone to significant leakage.

In addition, such large structures are difficult to move to a harvest location; if not moved to a harvest location, perishable commodities would have to be handled additional times, such as at the harvest location, then at a separate location where a room or container might be loaded with the perishable commodities. In addition, bulk quantities of perishable commodities may not be distributed to a single sales outlet, where all of a shipment is repackaged for a single consumer or type of consumer; bulk quantities of perishable commodities may be distributed in pallets or other smaller units which may be separated from one another for distribution to multiple distribution and/or sales outlets. At the multiple distribution and/or sales outlets, the pallets or smaller unit may be handled in different ways, e.g. to be repackaged, labeled, or the like, to address different sales processes and different consumers.

In addition to the shear cost and logistical problems of working with a large structure in agricultural operations, operating a vacuum pump continuously is a large financial and logistical expense. Still further problems are encountered when the need to keep the perishable commodities hydrated and/or refrigerated under vacuum conditions is considered.

Although potentially effective in reducing degradation during the time a perishable can be held in a vacuum chamber, degradation at a faster rate may resume once perishables are removed or when they handled additional times for further shipment, such as when bulk perishables are sub-divided for shipment to specific retail stores. This consideration further impacts the practical and financial viability of using a large vacuum chamber to store perishable commodities.

Although less active in a vacuum, pathogens may nonetheless remain present and alive, notwithstanding the vacuum, and may be active, resume activity and/or become more active following reintroduction of standard air pressure, temperature, and humidity.

Antimicrobials can kill or suppress pathogens. However, antimicrobials, whether natural or man-made, often have issues. For example, some perishables, such as blueberries and strawberries, must be kept dry and should not be drenched in a bath or coated in a wax containing an antimicrobial. Some perishables have a skin that is consumed, which limits an amount or type of antimicrobial that can be applied. Some antimicrobials can be applied pre-harvest, but not post-harvest, due to regulatory or health concerns. Before harvest, some antimicrobials are applied in amounts which exceed required dosage for a pre-harvest period, in the hope that a small residual amount of the antimicrobial will remain on the perishable commodity post-harvest. Some antimicrobials are toxic to humans, whether in the handling of the antimicrobial, such as when putting an antimicrobial in or removing an antimicrobial from a container of perishables, or in the handling or consumption of the perishable. Some antimicrobials are phytotoxic to some perishables and may cause undesired reactions, ranging from aesthetic (such as discoloration) to accelerated decomposition. Some antimicrobials may leave a residue on a perishable, wherein the residue may have an undesirable flavor.

Antimicrobials may interact chemically or physically with materials used to transport perishables. For example, antimicrobials may make certain materials brittle, may interfere with lubrication between moving parts (whether within a vacuum chamber or in a pump used to maintain a vacuum), may erode or degrade seals, may condense as a liquid or film, may clog pipes or channels, may interfere with or degrade sensors, and the like.

Interaction of antimicrobials with perishables and with equipment used to transport perishables would be particularly acute and difficult to manage in the context of vacuum chambers. For example, a vacuum chamber environment is expensive to create and maintain, vulnerable to external perturbation and internal structural or system failure, may include sensors and other mechanical and electrical equipment which can fail, may be visually opaque, and should not be breached until necessary. In addition, when gas is pumped out of a vacuum chamber, the removed gas is compressed by a pump. Compression of this gas can result in condensation on or close to moving parts of the pump, including parts which maintain a seal, including lubricated and dry seals between rigid components which may have tight tolerances.

After being harvested, perishables that are not frozen continue to undergo respiration, have an active metabolism, and continue to "live", notwithstanding that they may have been removed from a plant, whether or not placed in a vacuum chamber. Forms of respiration include aerobic respiration, fermentation, and anaerobic respiration.

After being harvested, most perishables categorized and/or sold as "fresh" should typically only undergo aerobic respiration, as fermentation and anaerobic respiration may cause changes which many consumers understand as or associate with "rot".

Respiration of perishables can be measured as respiratory quotient, or "RQ", which is the ratio of carbon-dioxide ("CO2") eliminated (or expelled) and O2 consumed. In general, RQ for a fresh perishable is thought to be in the range of 1:1 for a healthy plant, though RQ can vary by plant, by time of day, by age of plant, by temperature, by exposure to electromagnetic radiation, and the like. In addition, RQ studies may sample a small change in the composition of a large amount gas, which is expensive and can lead to or compound errors; such errors may be dealt with by, for example, by increasing the measurement time period and/or increasing the number of perishable commodities being sampled. However, this may result in a decrease in resolution, both temporally and with respect to variability across the number of perishable commodities being sampled, as different of the perishable commodities may have different RQ characteristics due to metabolic age ("ripeness"), different areas of the measured system may have different temperature, sun or light exposure, or the perishable commodities may have natural variability, and the like. Consequently, RQ studies for a wide range of plants, across a wide range of conditions and circumstances, which might indicate desirable RQ levels or correlate the effect of RQ on the flavor and desirability of a perishable commodity, are generally not available. Difficulty in collecting RQ information and lack of reliable target RQ information for a wide range of plants and difficulty in collecting such data may prevent or impede use of RQ measurement in relation to the storage of plants.

DETAILED DESCRIPTION

Please see concluding remarks, in this Detailed Description, which contain defined terms and which describe how to read and interpret this Detailed Description. Elements labeled with a label number including a trailing letter, as in, "127A" or "127B" represent one or more similar such elements, potentially with variations; singular references herein to one such element or to any object or noun, regardless whether drawn or whether labeled with a trailing letter, shall be understood to refer to one or more, unless the context makes clear otherwise. Where multiple variations are illustrated with a trailing letter, when referred to without the trailing letter, all such variations are referred to.

In overview, this disclosure relates to control of or introduction of an atmosphere in or into a vacuum chamber, including an atmosphere containing one or more antimicrobials, as well as associated equipment, which may include a manifold, a filter, sensors, a sachet comprising an antimicrobial, an antimicrobial delivery unit, a vent, a vacuum pump, vacuum tubes between components such as these, and valves between these components and the vacuum tubes, and methods, apparatuses, systems related to the foregoing.

Figure 1:
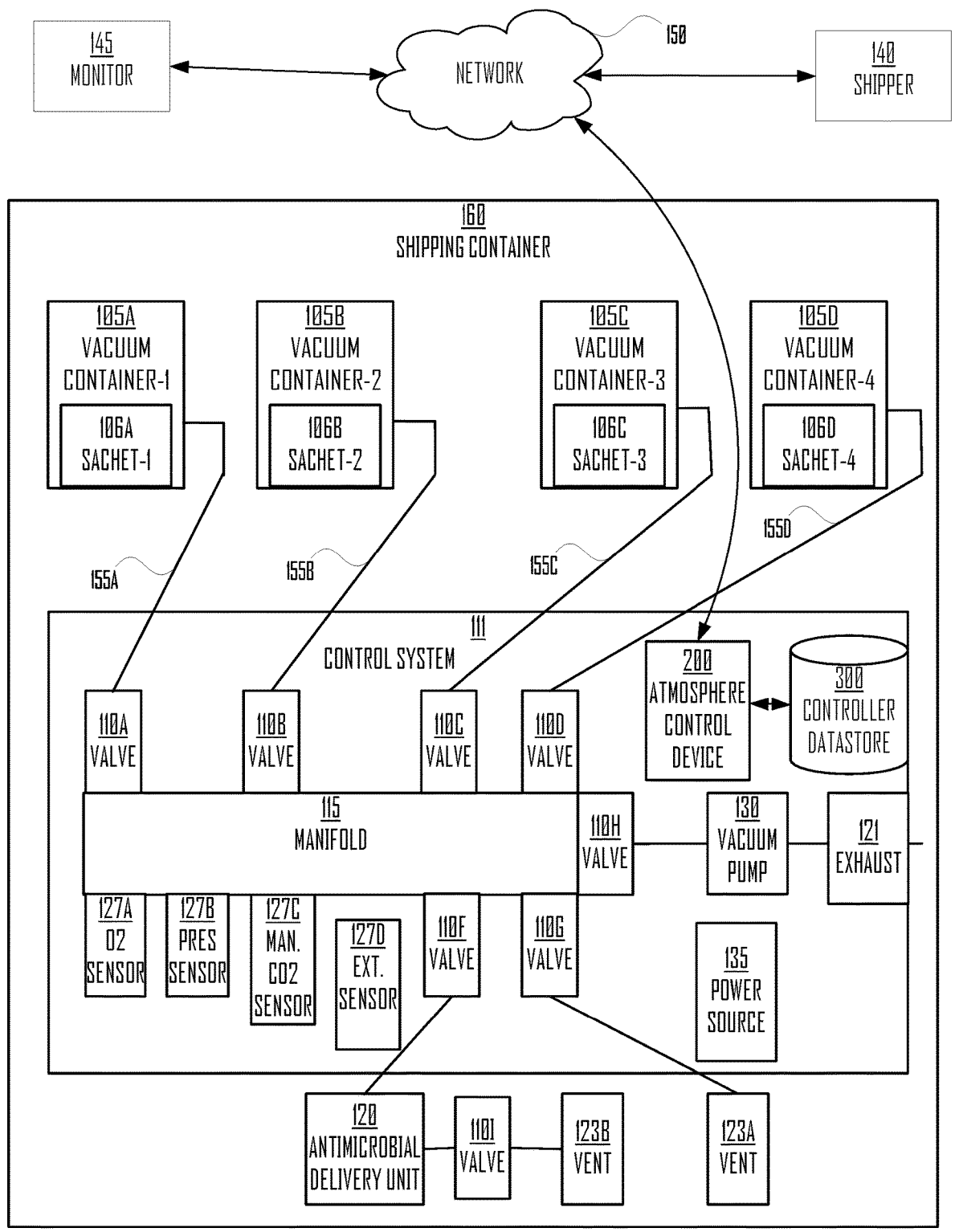
FIG. 1 is a network and device diagram illustrating an example of a shipping container containing a vacuum container (also referred to herein as a "vacuum chamber"), a valve connecting the vacuum container to a manifold, a sensor, an antimicrobial delivery unit, a vent, a vacuum pump, an atmospheric controller device, a power source, and a network incorporated with teachings of the present disclosure, according to some embodiments.

FIG. 1 is a network and device diagram illustrating an example of shipping container 160 containing vacuum containers 105A-105D and control system 111. Shipping container 160 is not necessary but illustrates an example of an environment in which one or more vacuum containers 105 and control system 111 may be found. Shipping container 160 may be in or carried by, for example, a truck, a ship, a barge, a vessel, or vehicle. A greater or lesser number of vacuum containers 105 and/or control system 111 may be within shipping container 160.

Vacuum containers 105 are chambers capable of withstanding atmospheric air pressure, for indefinitely long periods of time, when the interior space is depressurized to an internal vacuum down to 0 Torr or 0 millibar ("mbar") and arranged or configured to contain perishables. Vacuum containers 105 may be, for example, rectangular or tubular, with end caps. End caps may be removable, to allow arrangement of perishables within vacuum container 105.

Vacuum containers 105 may be portable or transportable; vacuum container 105 may be the size of, for example, a pallet commonly used to transport perishable commodities, such as for example, 48" by 40", 42" by 42", 48" by 48", or the like. Vacuum containers 105 may be sized to be transported on a pallet.

Sachet 106 are units of antimicrobial which may be placed in vacuum container 105, prior to being depressurized. As discussed further herein, antimicrobial in or on sachet 106 may evaporate or sublimate when vacuum container 105 is depressurized. Depressurization below a vapor pressure of an antimicrobial will encourage or cause the antimicrobial to evaporate or sublimate.

Vacuum containers 105 may be transported separately from control system 111. Vacuum containers 105 may be loaded with perishable commodities, connected to control system 111, evacuated or depressurized, handled as described herein, sealed in an evacuated condition (e.g. depressurized to an internal vacuum on the order of 0 to 150 Torr or 0 to 200 mbar), and transported in the evacuated or depressurized condition. Vacuum containers 105 may be periodically connected to control system 111, such as during transport, including at scheduled times, at waypoints (designated locations), at destinations, or the like. Vacuum containers 105 may comprise components of control system 111, such as, for example, pressure, temperature, or other sensors, wireless or wireline communication systems, and computer systems to support the same.

Vacuum containers 105 may be connected to control system 111 by one or more vacuum tubes 155A-155D. Vacuum tubes 155 may each comprise two (or more) sub-vacuum tubes. Where multiple sub-vacuum tubes lead to a single vacuum container 105, a first sub-vacuum tube may be used to withdraw gas from vacuum container 105, while a second sub-vacuum tube may be used to introduce gas into vacuum container 105. A single vacuum tube may be used to both withdraw and introduce gas into vacuum container 105. Vacuum tubes 155 may be fabricated to resist collapse under standard air pressure, notwithstanding low internal air pressure relative to external atmospheric pressure. Vacuum tubes 155 may connect to valves 110.

One or more vacuum containers 105 may be depressurized by a vacuum pump, whether or not through use of control system 111, sealed, and then later connected to control system 111 by one or more vacuum tubes 155.

Valves 110 may be operated manually or electronically, such as by activation of a solenoid or the like. Valves 110 may be opened and closed by atmosphere control device 200. Electrical wiring, not illustrated, may connect valves 110 to atmosphere control device 200 for electrical control of valves 110 by atmosphere control device 200. Atmosphere control device 200 may utilize perishable-container monitor module 400 (discussed further herein; perishable-container monitor module 400 may also be referred to herein as a "vacuum container control module") to activate one or more of valves 110 to create a connection between one or more of vacuum containers 105 and equipment in control system 111. Valves 110 may comprise a matrix of valves connected by vacuum tubes (or sub-vacuum tubes) which allow individual of the vacuum containers 105 and individual of vacuum tubes and sub-vacuum tubes to be attached to equipment in control system 111 in an order or arrangement that may be re-configured, such as depending on current requirements.

For example, all valves 110 may be closed, except valve 110D may be opened to connect vacuum tube 155D to manifold 115 and valve 110H may be opened to connect manifold 115 to vacuum pump 130. Gas may be then withdrawn from vacuum container-4 105D by vacuum pump 130, via manifold 115.

For example, all valves 110 may be closed, except valve 110H, connecting manifold 115 to vacuum pump 130. Vacuum pump 130 may draw the pressure within manifold 115 below a pressure in vacuum container-2 105B. Valve 110H may then be closed. Valve 110B may then be opened, exposing vacuum container-2 105B to the lower pressure in manifold 115 and allowing gas in vacuum container-2 105B to flow into manifold 115. Other configurations and methods of using manifold 115 are discussed herein. Multiple manifolds 115 and multiple valves 110 may be used on conjunction with vacuum pump 130 and or multiple vacuum pumps 130.

Valves (not illustrated) may be present between sensors 127 and manifold 115. Sensor 127 may comprise, for example, one or more of a gas sensor, such as one or more of manifold CO2 sensor 127C or external sensor 127D, O2 sensor 127A, a moisture or humidity sensor, an ion sensor, oxygen sensor 127A, a mass-spectrometer, a pH sensor, a pressure sensor, a temperature sensor, or the like. Sensor 127 may be directed toward and/or integrated into manifold 115, into one or more vacuum container 105, or into a vacuum tube 155, and may include or be connected to supporting electrical, computer, and data communications equipment to transmit information from such sensor to another device, such as atmosphere control device 200. An air filter may be present between manifold 115 and sensor 127 or between vacuum pump 130 and manifold 115 or vacuum container 105. An air filter may comprise, for example, one or more of a fiber filter, an activated charcoal filter, a membrane, a water or liquid filter, or the like.

Sensors 127 may have characteristics which may impede or make difficult use with or in low pressure conditions, as may be found in vacuum container 105. For example, certain CO2 sensors may not be reliable, may have a high error rate, or may not be usable when not exposed to atmospheric pressure. For example, an error rate of certain CO2 sensors in low pressure conditions within vacuum container 105 may exceed a rate of change in CO2 in vacuum container 105 under operating conditions. Apparatuses, systems, and methods are discussed herein which may address such shortcomings.

In addition to valves 110, sensors 127, and antimicrobial delivery unit 120, equipment in control system 111 may comprise an air filter, vacuum pump 130, exhaust 121, atmosphere control device 200, atmosphere control device datastore 300, vent 123A and 123B, and power source 135. Power source 135 may comprise a battery, an external power supply, a generator, or the like. Power source 135 may provide power to atmosphere control device 200, valves 110, sensors 127, vacuum pump 130, antimicrobial delivery unit 120, and other equipment on and components of control system 111 and shipping container 160.

Figure 2:
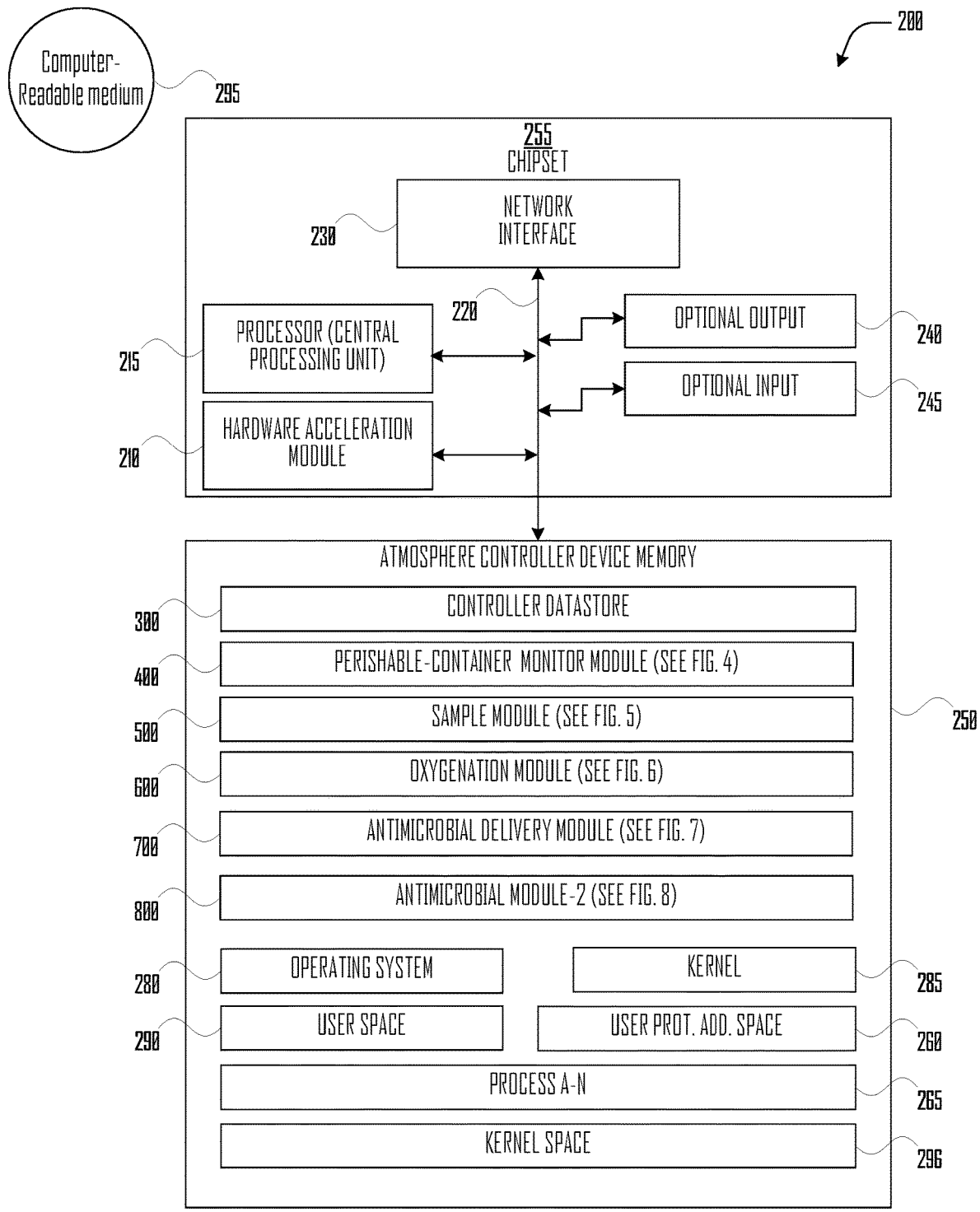
FIG. 2 is a functional block diagram illustrating an example of the atmosphere control device incorporated with teachings of the present disclosure, according to some embodiments.

Atmosphere control device 200 is discussed further in relation to FIG. 2.

Manifold 115 may be a space, pipe, or volume into or from which other pipes or vacuum tubes connect and which is generally sealed against uncontrolled entry of gas or liquid.

Vacuum pump 130 may be, for example, a scroll compressor, a piston compressor or pump, a turbine pump, or the like, suitable to develop low pressure in vacuum container 105, between 0 to 150 Torr or 0 to 200 mbar.

Figure 7:
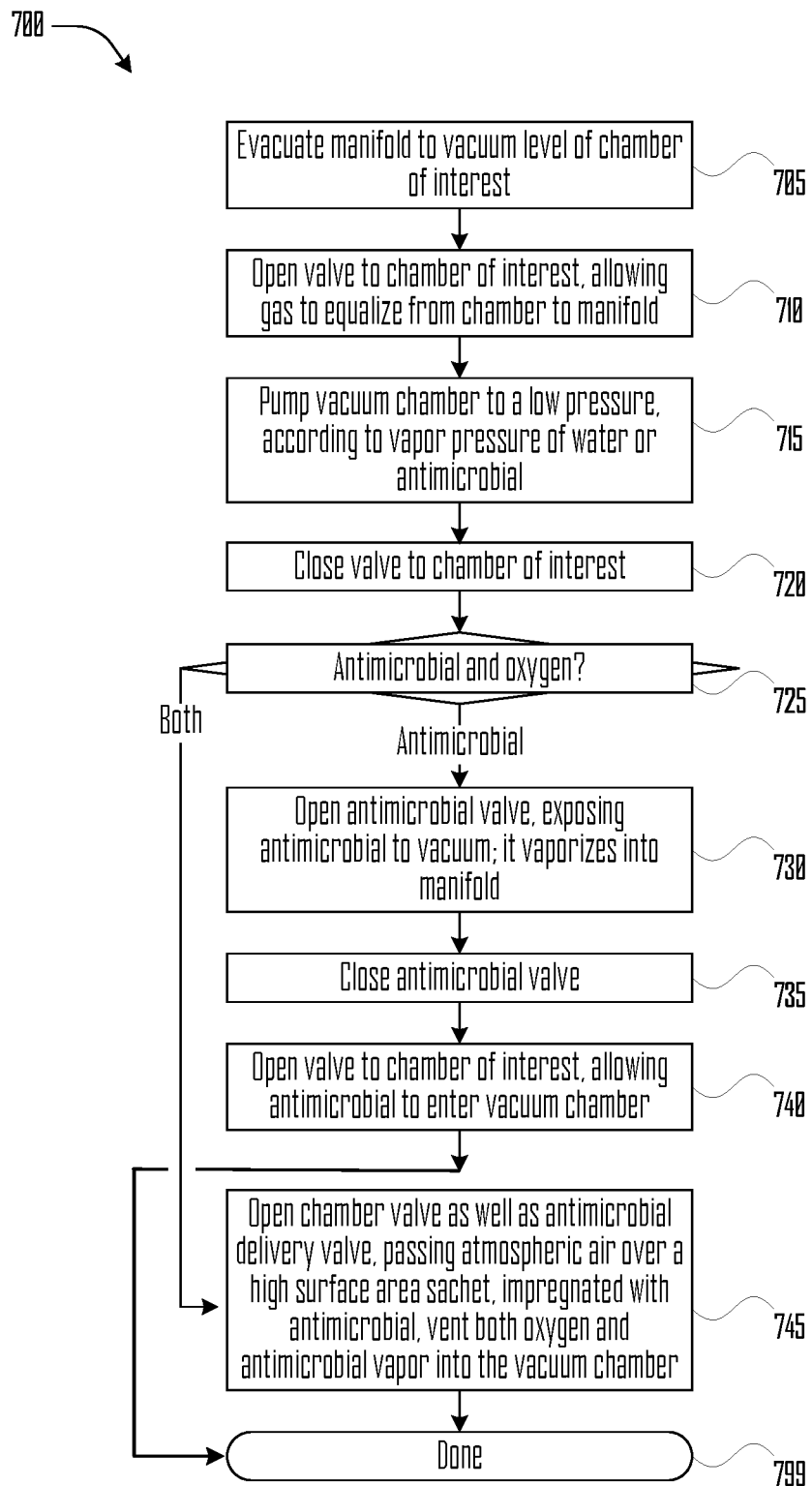
FIG. 7 illustrates example of a method performed by an antimicrobial delivery module, according to some embodiments.

Embodiments of antimicrobial delivery unit 120 are discussed further herein in relation to FIG. 7.

Shipping container 160 may further comprise a heat pump, refrigerator, or otherwise be configured to receive heating and or cooling services. Heating and or cooling to shipping container 160 may be under the direction of, may be sensed by, or may be controlled with information from atmosphere control device 200, such as information regarding temperature or other conditions in or around vacuum container 105 and/or control system 111.

As illustrated in FIG. 1, atmosphere control device 200 and/or equipment in or of a vacuum container 105 may connect to network 150. Network 150 in FIG. 1 may comprise computers, network connections among the computers, and software routines to enable communication between the computers over the network connections. Examples of network 150 comprise an Ethernet network, the Internet, and/or a wireless network, such as a GSM, TDMA, CDMA, EDGE, HSPA, LTE, satellite service, or other network provided by a wireless service provider. Connection to network 150 may be via a Wi-Fi, cellular, or wired connection. More than one network may be involved in a communication session between the illustrated devices. Connection to network 150 may require that the computers execute software routines which enable, for example, the seven layers of the OSI model of computer networking or equivalent in a wireless phone network. Connection to network 150 may occur transiently and/or opportunistically, such as when shipping container 160 arrives or departs a destination, when shipping container 160 is opened, or the like.

In FIG. 1, atmosphere control device 200 is illustrated as connecting to atmosphere control device datastore 300. Atmosphere control device datastore 300 is described further, herein, though, generally, should be understood as a datastore used by atmosphere control device 200.

Shipper 140 in FIG. 1 may comprise computers of a shipping, freight forwarding, leasing, or the like company or organization, which party may have a financial or other interest in the status of shipping container 160 and/or of vacuum container 105. Monitor 145 in FIG. 1 may comprise computers of a grower, a purchaser, or the like company or organization, which party may have a financial or other interest in the status of shipping container 160, of vacuum container 105, and/or of control system 111. Shipper 140 and/or monitor 145 may receive information regarding the status of shipping container 160, vacuum container 105, and/or of control system 111.

FIG. 2 is a functional block diagram illustrating an example of atmosphere control device 200 incorporated with teachings of the present disclosure, according to some embodiments. Atmosphere control device 200 may include chipset 255. Chipset 255 may include processor 215, input/output (I/O) port(s) and peripheral devices, such as output 240 and input 245, and network interface 230, and atmosphere control device memory 250, all interconnected via bus 220. Network interface 230 may be utilized to form connections with network 150, with atmosphere control device datastore 300, or to form device-to-device connections with other computers.

Chipset 255 may include communication components and/or paths, e.g., buses 220, that couple processor 215 to peripheral devices, such as, for example, output 240 and input 245, which may be connected via I/O ports. Processor 215 may include one or more execution cores (CPUs). For example, chipset 255 may also include a peripheral controller hub (PCH) (not shown). In another example, chipset 255 may also include a sensors hub (not shown). Input 245 and output 240 may include, for example, user interface device(s) including a display, a touch-screen display, printer, keypad, keyboard, etc., sensor(s), including sensors discussed in relation to sensors 127, accelerometer, global positioning system (GPS), gyroscope, etc., communication logic, wired and/or wireless, storage device(s) including hard disk drives, solid-state drives, removable storage media, etc. I/O ports for input 245 and output 240 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Hardware acceleration module 210 may provide hardware acceleration of various functions otherwise performed by modules and devices disclosed herein. Hardware acceleration module may be provided by, for example, Integrated Performance Primitives software library by Intel Corporation, as may be executed by an Intel (or other compatible or similar) chip, and which may implement, for example, a library of programming functions involved with real time computer processing. Such a library includes, for example, OpenCV. OpenCV includes, for example, a statistical machine learning library including boosting, decision tree learning, gradient boosting trees, expectation-maximization algorithms, k-nearest neighbor algorithm, naïve Bayes classifier, artificial neural networks, random forest, and a support vector machine. In embodiments, hardware acceleration module 210 may be a programmed or programmable field programmable gate array ("FPGA"), i.e., a FPGA in which gate arrays are configured with a bit stream to embody the logic of the hardware accelerated function (equivalent to the logic provided by the executable instructions of a software embodiment of the function). In embodiments, hardware acceleration module 210 may also or alternatively include components of or supporting atmosphere control device memory 250.

Atmosphere control device memory 250 may generally comprise a random access memory ("RAM"), a read only memory ("ROM"), and a permanent mass storage device, such as a disk drive or SDRAM (synchronous dynamic random-access memory). Atmosphere control device memory 250 may store program code for modules and/or software routines, such as, for example, hardware acceleration module 210, atmosphere control device datastore 300 (illustrated and discussed further in relation to FIG. 3), and perishable-container monitor module (illustrated and discussed further in relation to FIG. 4).

Atmosphere control device memory 250 may also store operating system 280. These software components may be loaded from a non-transient computer readable storage medium 295 into atmosphere control device memory 250 using a drive mechanism associated with a non-transient computer readable storage medium 295, such as a floppy disc, tape, DVD/CD-ROM drive, memory card, or other like storage medium. In some embodiments, software components may also or instead be loaded via a mechanism other than a drive mechanism and computer readable storage medium 295 (e.g., via network interface 230).

Figure 3:
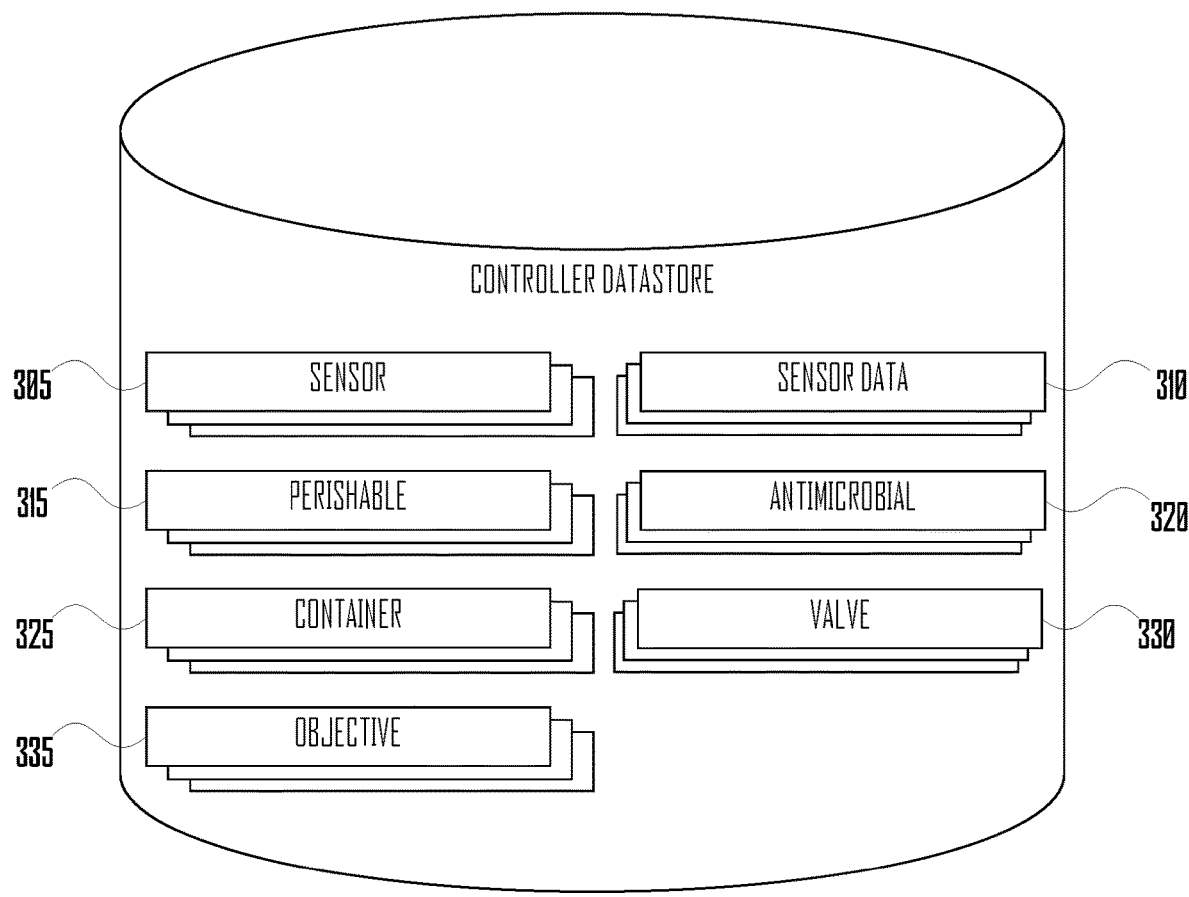
FIG. 3 is a functional block diagram illustrating an example of an atmosphere control device datastore incorporated with teachings of the present disclosure, consistent with embodiments of the present disclosure.

Atmosphere control device memory 250 is also illustrated as comprising kernel 285, kernel space 296, user space 290, user protected address space 260, and atmosphere control device datastore 300 (illustrated and discussed further in relation to FIG. 3).

Atmosphere control device memory 250 may store one or more process 265 (i.e., software application(s), which may be executing or which may be ready to be executed). Process 265 may be stored in user space 290. Process 265 may include one or more other process 265a . . . 265n. One or more process 265 may execute generally in parallel, i.e., as a plurality of processes and/or a plurality of threads.

Atmosphere control device memory 250 is further illustrated as storing operating system 280 and/or kernel 285. The operating system 280 and/or kernel 285 may be stored in kernel space 296. In some embodiments, operating system 280 may include kernel 285. Operating system 280 and/or kernel 285 may attempt to protect kernel space 296 and prevent access by certain of process 265a . . . 265n.

Kernel 285 may be configured to provide an interface between user processes and circuitry associated with atmosphere control device 200. In other words, kernel 285 may be configured to manage access to processor 215, chipset 255, I/O ports and peripheral devices by process 265. Kernel 285 may include one or more drivers configured to manage and/or communicate with elements of atmosphere control device 200 (i.e., processor 215, chipset 255, I/O ports and peripheral devices).

Atmosphere control device 200 may also comprise or communicate via Bus 220 and/or network interface 230 with atmosphere control device datastore 300, illustrated and discussed further in relation to FIG. 3. In various embodiments, bus 220 may comprise a high speed serial bus, and network interface 230 may be coupled to a storage area network ("SAN"), a high speed wired or wireless network, and/or via other suitable communication technology. Atmosphere control device 200 may, in some embodiments, include many more components than as illustrated. However, it is not necessary that all components be shown in order to disclose an illustrative embodiment.

FIG. 3 is a functional block diagram illustrating an example of an atmosphere control device datastore 300 incorporated with teachings of the present disclosure, consistent with embodiments of the present disclosure.

The components of atmosphere control device datastore 300 may include data groups used by modules and/or routines, e.g., sensor 305, sensor data 310, perishable 315, antimicrobial 320, container 325, valve 330, and sensor objective 335 (to be described more fully below in discussion of other of the Figures). The data groups used by modules or routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

Figure 4:
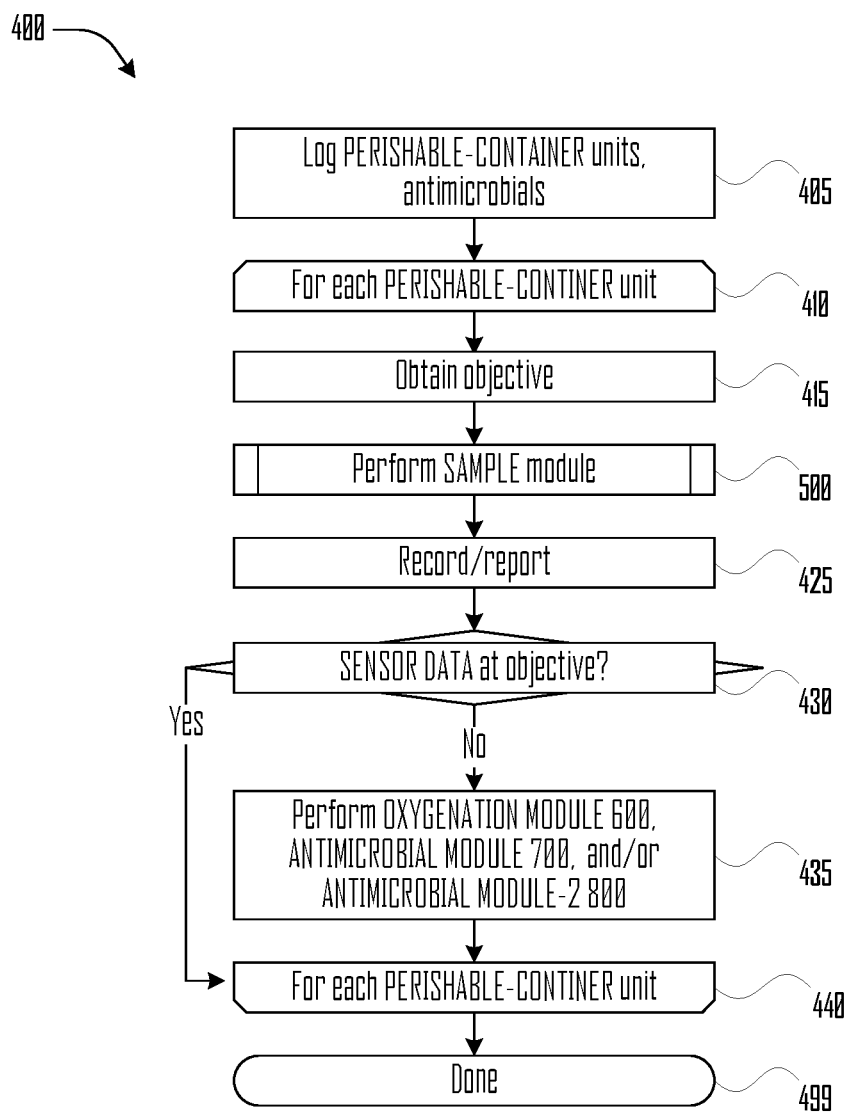
FIG. 4 illustrates example of a method performed by a perishable-container monitor module, according to some embodiments.

FIG. 4 is a flow diagram illustrating an example of a method performed by perishable-container monitor module 400, according to some embodiments. Perishable-container monitor module 400 may be performed by, for example, atmosphere control device(s), such as atmosphere control device 200, according to some embodiments. Components of perishable-container monitor module 400 may be performed by or with assistance from a hardware accelerator, such as hardware accelerator module 210.

At block 405, perishable-container monitor module 400 may log, receive, or otherwise note the presence of different perishables and/or antimicrobial sachets in different vacuum containers 105 and/or of the presence of antimicrobial in an antimicrobial delivery unit 120, such as via perishable 315, container 325, and or antimicrobial 320 records.

Opening loop block 410 to closing loop block 440 may iterate over each container 325 containing perishable 315, managed by perishable-container monitor module 400.

At block 415, perishable-container monitor module 400 may obtain one or more objectives, such as value(s) for one or more sensor readings, a target sensor reading, an objective to filter air routed to or from a vacuum container and to or from a sensor, manifold, pump, or the like, an objective to maintain a concentration of antimicrobial, an objective to measure an air pressure, a temperature, a humidity level, a CO2 level, an O2 level, an RQ, or the like. Objectives may be obtained from, for example, one or more objective 335 records. For example, an objective may be to reduce pressure in a vacuum chamber; an objective may be to reduce pressure in a vacuum chamber to a level below a vaporization pressure of an antimicrobial.

At block 500, perishable-container monitor module 400 may perform sample module 500, for example to obtain pressure, O2, CO2, temperature, and other sample values. For example, sample module 500 may reduce pressure in the vacuum chamber to a low pressure value, e.g. a value on the order of 0 to 150 Torr or 0 to 200 mbar or, e.g., below a vaporization pressure of an antimicrobial. Sample module 500 may obtain values from sensors, such as sensors 127.

At block 425, perishable-container monitor module 400 may record or report all or a subset of the sampled values, for example, in a sensor data 310 record. Sampled values may be recorded after cleaning or filtering the data, such as to eliminate erroneous records, out of a range records, or the like.

At block 425, perishable-container monitor module 400 may log and/or report the sensor data received at block 425, such as to an external recipient.

At decision block 430, perishable-container monitor module 400 may determine whether sensor data received at block 425 has achieved an objective, such as objective 335 of block 415.

If sensor data has not achieved objective 335, at block 435, perishable-container monitor module 400 may perform oxygenation module 600, antimicrobial module 700, and/or antimicrobial module-2 800 or perishable-container monitor module 400 may return to opening loop block 410 to continue to iterate over perishable 315 and container 325 combinations that it monitors and controls, as may be the case when the objective does not relate to oxygenation module 600 and/or antimicrobial module 700 (e.g. if the objective is to reduce pressure within a container 325 to a level).

At closing loop block 440, which may follow, for example, from block 435 or from decision block 430, perishable-container monitor module 400 may return to opening loop block 410 to continue to iterate over perishable 315 and container 325 combinations that it monitors and controls.

Upon occurrence of an interrupt or exit condition, perishable-container monitor module 400 may proceed to done or return block 499. At done or return block 499, perishable-container monitor module 400 may conclude or may return to another process.

In embodiments, perishable-container monitor module 400 may be performed after vacuum container 105 has been loaded with perishable commodities, vacuum container 105 may be evacuated or depressurized, objectives may be achieved, and one or more valves 110 may be activated to isolate evacuated vacuum container 105. The evacuated vacuum container 105 may then be transported, whether separately from control system 111, in conjunction with, or meeting back up with control system 111. When re-connected to control system 111, vacuum container 105, control system 111 may initiate perishable-container monitor module 400 and resume monitoring and control of vacuum container 105.

Figure 5:
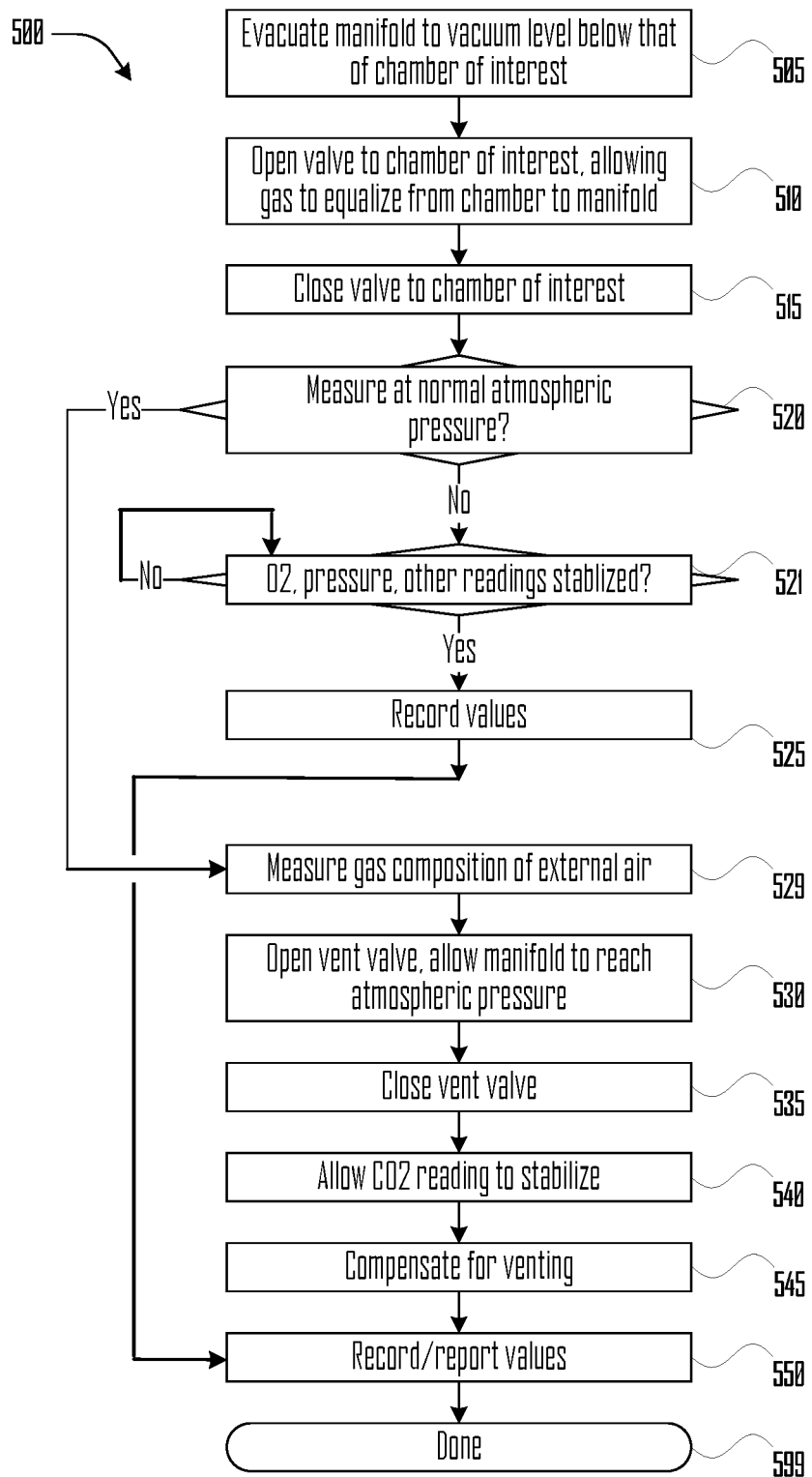
FIG. 5 illustrates example of a method performed by a sample module, according to some embodiments.

FIG. 5 is a flow diagram illustrating an example of a method performed by sample module 500, according to some embodiments. Sample module 500 may be performed by, for example, atmosphere control device(s), such as atmosphere control device 200, according to some embodiments. Components of sample module 500 may be performed by or with assistance from a hardware accelerator, such as hardware accelerator module 210.

At block 505, sample module 500 may evacuate a manifold, such as manifold 115, to a vacuum pressure level below that of a chamber of interest, such as one of vacuum container-1 to 105A-105D or N.

At block 510, sample module 500 may open valve between chamber of interest and manifold, allowing gas pressure to equalize between chamber of interest and manifold.

At block 515, sample module 500 may close valve between chamber of interest and manifold.

At decision block 520, sample module 500 may determine whether the measurement technique for an object should be performed at low pressure, e.g. 0 to 150 Torr or 0 to 200 mbar, or whether it should be performed at atmospheric pressure. For example, decision block 520 may determine that a CO2 measurement should be performed at atmospheric pressure, whereas an O2 or other measurement can be performed at low pressure.

At block 521, sample module 500 may determine if oxygen ("O2"), pressure, nitrogen and or other sensor readings (e.g. such as CO2 readings, if sensor 127 can provide a reliable measurement) have stabilized, such as according to output of such sensors, after a period of time has elapsed, or the like.

At block 525, sample module 500 may record all or a subset of sensor values.

At block 529, which may follow decision block 520, sample module 500 may read a gas composition the external gas source, such as a CO2 or other gas composition of the external air. This may be performed, for example, using external sensor 127D or the like external gas sensor, which may be a CO2 sensor. Measured values may be recorded in one or more sensor data 310 records.

At block 530, sample module 500 may open vent valve, such as valve 110G, and allow manifold to reach atmospheric pressure or another pressure, above the low pressure in the vacuum container. The vent valve may be to external air or to a dedicated gas supply with a known composition. The gas composition of external air or the external gas source may have been measured at block 529.

At block 535, sample module 500 may close vent valve.

At block 540, sample module 500 may allow or determine if readings of the sensor to stabilize. For example, sample module 500 may allow CO2 readings to stabilize.

At block 545, sample module 500 may compensate the readings. Compensation may be based on the volume of manifold, the pressure in the manifold before the vent valve was opened, sensor readings which may have been captured, such as at block 529, and external levels of or for the sensed gas. For example, when measuring CO2 levels in the manifold after bringing the manifold to atmospheric pressure using external air, sample module 500 may compensate the CO2 readings in the manifold based on CO2 levels in external air, as may have been measured by external sensor 127D at block 529.

At block 550, sample module 500 may record and/or report all or a subset of the compensated CO2 values. Such values may be recorded in one or more sensor data 310 records.

Processing of the O2, CO2, pressure, and other sample values may take place. Processing may be according to logic, instructions, and/or modules in atmosphere control device 200 and/or controller datastore 300. Processing may determine RQ. RQ ratio(s) or value(s) may be associated with plant stress, decomposition, activity of fungus or other pathogens, and the like. Maintenance of RQ ratio(s) or value(s) may be an objective. Maintenance of RQ ratio(s) or value(s) may be performed by, for example, operation of oxygenation module 600. Perishable-container monitor module 400 (and subroutines thereof) may continue to iterate over objectives.

Upon occurrence of an interrupt or exit condition, sample module 500 may proceed to done or return block 599. At done or return block 599, sample module 500 may conclude or may return to another process.

Figure 6:
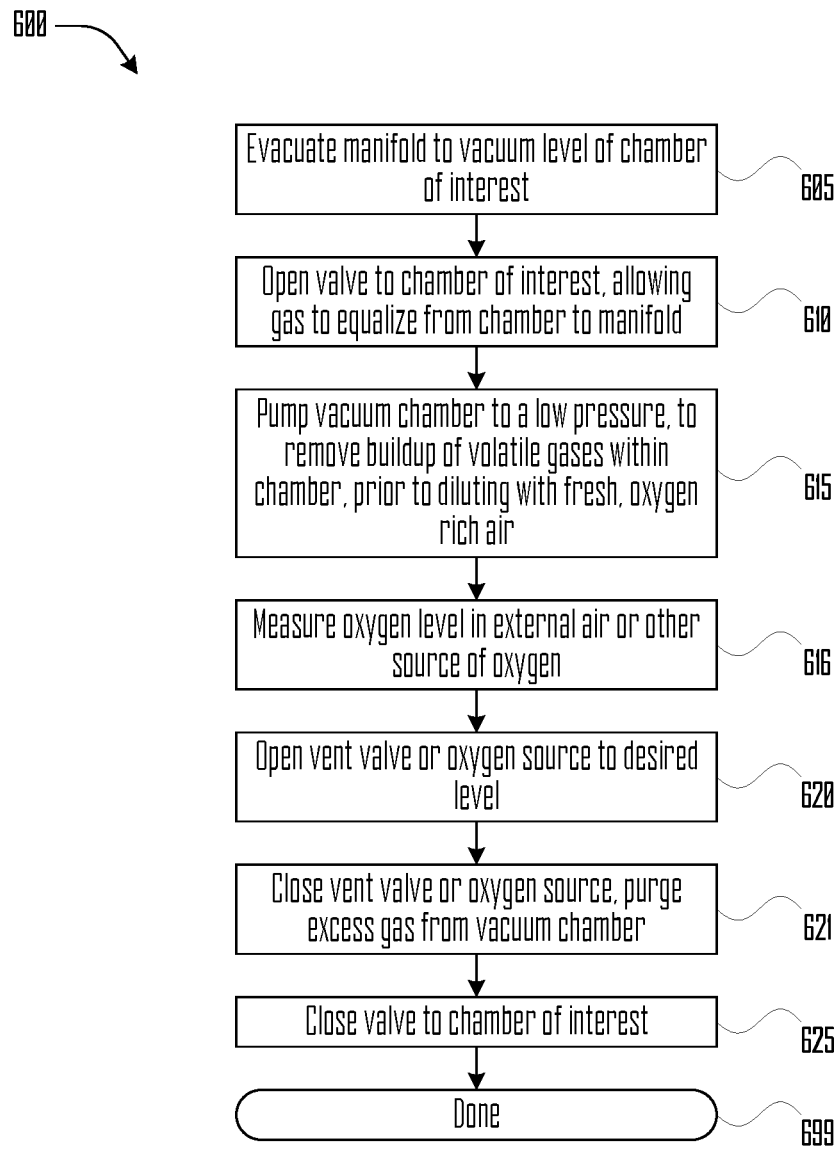
FIG. 6 illustrates example of a method performed by an oxygenation module, according to some embodiments.

FIG. 6 is a flow diagram illustrating an example of a method performed by oxygenation module 600, according to some embodiments. Oxygenation module 600 may be performed by, for example, atmosphere control device(s), such as atmosphere control device 200, according to some embodiments. Components of oxygenation module 600 may be performed by or with assistance from a hardware accelerator, such as hardware accelerator module 210.

At block 605, oxygenation module 600 may evacuate a manifold, such as manifold 115, to a vacuum pressure of a chamber of interest, such as one of vacuum container-1 to 105A-105D or N.

At block 610, oxygenation module 600 may open valve between chamber of interest and manifold, allowing gas pressure to equalize between chamber of interest and manifold.

At block 615, oxygenation module 600 may activate, for example, vacuum pump 130 to pump chamber of interest and manifold to a low pressure, below that of chamber of interest, to remove buildup of volatile gases within chamber.

At block 616 oxygenation module 600 may read a gas composition of the external gas source, such as an O2 gas composition of the external air. This may be performed, for example, using external sensor 127D, which may be an oxygen sensor, or the like external gas sensor. Measured values may be recorded in one or more sensor data 310 records.

At block 620, oxygenation module 600 may open a valve between manifold and vent valve or another oxygen source to allow in a desired amount or concentration of oxygen. The desired amount or concentration may be sensed and/or calculated by oxygenation module 600, for example, based on a known flow rate of gas through the valve and the external level of oxygen, as may have been measured in block 616, based on a known volume of manifold and the external level of oxygen, and the like. In an alternative embodiment, oxygenation module 600 may close a valve between chamber of interest and manifold, may then open a valve between manifold and vent or another oxygen source and allow the manifold to equalize with the oxygen source. Oxygenation module 600 may then close the valve between manifold and vent or another oxygen source and then open the valve between chamber of interest and manifold, thereby allowing the unit of higher pressure oxygen in manifold to flow into the chamber of interest. This may enable a stepwise introduction of oxygen or another gas into the chamber of interest.

At block 621, oxygenation module 600 may purge excess gas from the chamber of interest to a desired pressure level through activation of vacuum pump and valves. Purge of excess gas may be performed in a continuous operation, by vacuum pump, or in steps, by evacuating manifold to a pressure level below that of chamber of interest, closing manifold to vacuum pump, opening chamber of interest to evacuated manifold. Pressure and/or amount or concentration of gas, such as oxygen, may be measured in the chamber of interest and/or in the manifold.

At block 625, oxygenation module 600 may close valve to the chamber of interest.

Upon occurrence of an interrupt or exit condition, oxygenation module 600 may proceed to done or return block 699. At done or return block 699, oxygenation module 600 may conclude or may return to another process.

FIG. 7 is a flow diagram illustrating an example of a method performed by antimicrobial module 700, according to some embodiments. Antimicrobial module 700 may be performed by, for example, atmosphere control device(s), such as atmosphere control device 200, according to some embodiments. Components of antimicrobial module 700 may be performed by or with assistance from a hardware accelerator, such as hardware accelerator module 210.

At block 705, antimicrobial module 700 may evacuate a manifold, such as manifold 115, to a vacuum pressure of a chamber of interest, such as one of vacuum container-1 to 105A-105D or N.

At block 710, antimicrobial module 700 may open valve between chamber of interest and manifold, allowing gas pressure to equalize between chamber of interest and manifold.

At block 715, antimicrobial module 700 may pump chamber of interest and manifold to a low pressure, such as according to a vapor pressure of water or a vapor pressure of an antimicrobial.

At block 720, antimicrobial module 700 may close valve between chamber of interest and manifold. In an embodiment, such as if a sachet of antimicrobial is present in vacuum chamber 105, antimicrobial module 700 may close the valve between chamber of interest and manifold and proceed to done block 799 from block 720.

At decision block 725, antimicrobial module 700 may determine whether antimicrobial treatment and oxygenation and/or other procedures are to be performed.

At block 730, antimicrobial module 700 may open a valve between an antimicrobial delivery unit, such as antimicrobial delivery unit 120, and manifold, exposing antimicrobial in antimicrobial delivery unit to low pressure in manifold. Antimicrobial in antimicrobial delivery unit may sublimate or evaporate into manifold. Sublimation or evaporation of antimicrobial may be stopped by activation of valve after a determined period of time and/or sublimation or evaporation of antimicrobial may be determined by a volume of manifold and a vapor pressure of antimicrobial. A volume of manifold may be determined in advance of deployment or may be changed, dynamically, after deployment, based on an amount of antimicrobial to be delivered in one dose.

Antimicrobial delivery unit may comprise an antimicrobial. Antimicrobial may be present in a single-use or multiple-use unit as a liquid, solid, or paste. More than one antimicrobial delivery unit may be attached to manifold. Antimicrobial may be present in a multi-use antimicrobial delivery unit as a liquid, solid, or paste. Antimicrobial may be present in a high surface area sachet within antimicrobial delivery unit; sachet may be saturated with antimicrobial; sachet may contain an amount of antimicrobial determined to provide a dose to perishables for a predicted transit of the perishables. Sachet may be in a vacuum chamber, such as when placed in a vacuum chamber, such as when vacuum chamber is loaded with perishables. Different sachets may be placed in separate vacuum chambers.

Antimicrobial in antimicrobial delivery unit or in sachet may sublimate or evaporate when exposed to a pressure level below that of a vaporization pressure of antimicrobial.

Previous approaches to introduction of an antimicrobial into a chamber may have involved aerosolizing (such as through mechanical action or pushing a liquid through an orifice) or vaporizing (such as through heat) an antimicrobial in a first vessel at atmospheric pressure, modestly reducing the pressure in a second vessel containing the perishable to a pressure level modestly below that of atmospheric pressure, but not to the low pressure discussed herein (between 0 and 150 Torr or 0 and 200 mbar or below the vaporization pressure of the antimicrobial), connecting the first and second vessels, and allowing the aerosolized or vaporized antimicrobial to flow from the first vessel to the second vessel. However, the previous approaches do not teach or suggest placing the antimicrobial (potentially in combination with a carrier) into the vessel containing the perishable, reducing the pressure in the vessel containing the perishable to the low pressure discussed herein (between 0 and 150 Torr or 0 and 200 mbar or below the vaporization pressure of the antimicrobial), and thereby sublimating or evaporating the antimicrobial in the vessel containing the perishable due to or aided by low pressure discussed herein (between 0 and 150 Torr or 0 and 200 mbar or below the vaporization pressure of the antimicrobial). Nor does this teach or suggest placing the antimicrobial into a first vessel, such as a manifold or an antimicrobial delivery chamber connected to a manifold, reducing the pressure in the first vessel to the low pressure discussed herein (between 0 and 150 Torr or 0 and 200 mbar or below the vaporization pressure of the antimicrobial), sublimating or evaporating the antimicrobial in the first vessel due to or aided by the low pressure discussed herein, and then connecting the first vessel to a second vessel containing a perishable, wherein, prior to being connected, the second vessel may be at a lower pressure than the first vessel, resulting in flow of the sublimated or evaporated antimicrobial into the second vessel containing the perishable. Nor does this teach or suggest placing the antimicrobial into a first vessel, such as a manifold or an antimicrobial delivery chamber connected to a manifold, reducing the pressure in the first vessel to the low pressure discussed herein (between 0 and 150 Torr or 0 and 200 mbar or below the vaporization pressure of the antimicrobial), connecting the first vessel to a second vessel containing a perishable, wherein, prior to being connected, the second vessel may be at a lower pressure than the first vessel, opening a vent valve to the manifold or antimicrobial delivery chamber connected to the manifold, causing the antimicrobial in the first vessel to sublimate or evaporate in the flow of gas from the vent, and allowing the flow of gas and sublimated or evaporated antimicrobial to flow into the second vessel containing the perishable.

Antimicrobial may comprise a fungicide. An antimicrobial may comprise, for example, one or more of a natural antimicrobial such as sulfur, lime-sulfur, copper, horticultural oil, neem oil, bicarbonates, a natural essential oil, such as menthol or peppermint and/or the antimicrobial may comprise one or more of the following, including in combination with a carrier: (3-ethoxypropyl)mercury bromide, 2-methoxyethylmercury chloride, 2-phenylphenol, 8-hydroxyquinoline sulfate, 8-phenylmercurioxyquinoline, acibenzolar, acylamino acid fungicides, acypetacs, aldimorph, aliphatic nitrogen fungicides, allyl alcohol, amide fungicides, ampropylfos, anilazine, anilide fungicides, antibiotic fungicides, aromatic fungicides, aureofungin, azaconazole, azithiram, azoxystrobin, barium polysulfide, benalaxyl, benalaxyl-M, benodanil, benomyl, benquinox, bentaluron, benthiavalicarb, benzalkonium chloride, benzamacril, benzamide fungicides, benzamorf, benzanilide fungicides, benzimidazole fungicides, benzimidazole precursor fungicides, benzimidazolylcarbamate fungicides, benzohydroxamic acid, benzothiazole fungicides, bethoxazin, binapacryl, biphenyl, bitertanol, bithionol, bixafen, blasticidin-S, Bordeaux mixture, boric acid, boscalid, bridged diphenyl fungicides, bromuconazole, bupirimate, Burgundy mixture, buthiobate, sec-butylamine, calcium polysulfide, captafol, captan, carbamate fungicides, carbamorph, carbanilate fungicides, carbendazim, carboxin, carpropamid, carvone, Cheshunt mixture, chinomethionat, chlobenthiazone, chloraniformethan, chloranil, chlorfenazole, chlorodinitronaphthalene, chloroform, chloroneb, chloropicrin, chlorothalonil, chlorquinox, chlozolinate, ciclopirox, climbazole, clotrimazole, conazole fungicides, conazole fungicides (imidazoles), conazole fungicides (triazoles), copper(II) acetate, copper(II) carbonate, basic, copper fungicides, copper hydroxide, copper naphthenate, copper oleate, copper oxychloride, copper(II) sulfate, copper sulfate, basic, copper zinc chromate, cresol, cufraneb, cuprobam, cuprous oxide, cyazofamid, cyclafuramid, cyclic dithiocarbamate fungicides, cycloheximide, cyflufenamid, cymoxanil, cypendazole, cyproconazole, cyprodinil, dazomet, DBCP, debacarb, decafentin, dehydroacetic acid, dicarboximide fungicides, dichlofluanid, dichlone, dichlorophen, dichlorophenyl, dichlozoline, diclobutrazol, diclocymet, diclomezine, dicloran, diethofencarb, diethyl pyrocarbonate, difenoconazole, diflumetorim, dimethirimol, dimethomorph, dimoxystrobin, diniconazole, diniconazole-M, dinitrophenol fungicides, dinobuton, dinocap, dinocap-4, dinocap-6, dinocton, dinopenton, dinosulfon, dinoterbon, diphenylamine, dipyrithione, disulfiram, ditalimfos, dithianon, dithiocarbamate fungicides, DNOC, dodemorph, dodicin, dodine, donatodine, drazoxolon, edifenphos, epoxiconazole, etaconazole, etem, ethaboxam, ethirimol, ethoxyquin, ethylene oxide, ethylmercury 2,3-dihydroxypropyl mercaptide, ethylmercury acetate, ethylmercury bromide, ethylmercury chloride, ethylmercury phosphate, etridiazole, famoxadone, fenamidone, fenaminosulf, fenapanil, fenarimol, fenbuconazole, fenfuram, fenhexamid, fenitropan, fenoxanil, fenpiclonil, fenpropidin, fenpropimorph, fentin, ferbam, ferimzone, fluazinam, Fluconazole, fludioxonil, flumetover, flumorph, fluopicolide, fluoroimide, fluotrimazole, fluoxastrobin, fluquinconazole, flusilazole, flusulfamide, flutolanil, flutriafol, fluxapyroxad, folpet, formaldehyde, fosetyl, fuberidazole, furalaxyl, furametpyr, furamide fungicides, furanilide fungicides, furcarbanil, furconazole, furconazole-cis, furfural, furmecyclox, furophanate, glyodin, griseofulvin, guazatine, halacrinate, hexachlorobenzene, hexachlorobutadiene, hexachlorophene, hexaconazole, hexylthiofos, hydrargaphen, hymexazol, imazalil, imibenconazole, imidazole fungicides, iminoctadine, inorganic fungicides, inorganic mercury fungicides, iodomethane, ipconazole, iprobenfos, iprodione, iprovalicarb, isopropyl alcohol, isoprothiolane, isovaledione, isopyrazam, kasugamycin, ketoconazole, kresoxim-methyl, Lime sulfur (lime sulphur), mancopper, mancozeb, maneb, mebenil, mecarbinzid, mepanipyrim, mepronil, mercuric chloride, mercuric oxide, mercurous chloride, metalaxyl, metalaxyl-M (a.k.a. Mefenoxam), metam, metazoxolon, metconazole, methasulfocarb, methfuroxam, methyl bromide, methyl isothiocyanate, methylmercury benzoate, methylmercury dicyandiamide, methylmercury pentachlorophenoxide, metiram, metominostrobin, metrafenone, metsulfovax, milneb, morpholine fungicides, myclobutanil, myclozolin, N-(ethylmercury)-p-toluenesulfonanilide, nabam, natamycin, nystatin, β-nitrostyrene, nitrothal-isopropyl, nuarimol, OCH, octhilinone, ofurace, oprodione, organomercury fungicides, organophosphorus fungicides, organotin fungicides, orthophenyl phenol, orysastrobin, oxadixyl, oxathiin fungicides, oxazole fungicides, oxine copper, oxpoconazole, oxycarboxin, pefurazoate, penconazole, pencycuron, pentachlorophenol, penthiopyrad, phenylmercuriurea, phenylmercury acetate, phenylmercury chloride, phenylmercury derivative of pyrocatechol, phenylmercury nitrate, phenylmercury salicylate, phenylsulfamide fungicides, phosdiphen, Phosphite, phthalide, phthalimide fungicides, picoxystrobin, piperalin, polycarbamate, polymeric dithiocarbamate fungicides, polyoxins, polyoxorim, polysulfide fungicides, potassium azide, potassium polysulfide, potassium thiocyanate, probenazole, prochloraz, procymidone, propamocarb, propiconazole, propineb, proquinazid, prothiocarb, prothioconazole, pyracarbolid, pyraclostrobin, pyrazole fungicides, pyrazophos, pyridine fungicides, pyridinitril, pyrifenox, pyrimethanil, pyrimidine fungicides, pyroquilon, pyroxychlor, pyroxyfur, pyrrole fungicides, quinacetol, quinazamid, quinconazole, quinoline fungicides, quinomethionate, quinone fungicides, quinoxaline fungicides, quinoxyfen, quintozene, rabenzazole, salicylanilide, silthiofam, silver, simeconazole, sodium azide, sodium bicarbonate[2][3], sodium orthophenylphenoxide, sodium pentachlorophenoxide, sodium polysulfide, spiroxamine, streptomycin, strobilurin fungicides, sulfonanilide fungicides, sulfur, sulfuryl fluoride, sultropen, TCMTB, tebuconazole, tecloftalam, tecnazene, tecoram, tetraconazole, thiabendazole, thiadifluor, thiazole fungicides, thicyofen, thifluzamide, thymol, triforine, thiocarbamate fungicides, thiochlorfenphim, thiomersal, thiophanate, thiophanate-methyl, thiophene fungicides, thioquinox, thiram, tiadinil, tioxymid, tivedo, tolclofos-methyl, tolnaftate, tolylfluanid, tolylmercury acetate, triadimefon, triadimenol, triamiphos, triarimol, triazbutil, triazine fungicides, triazole fungicides, triazoxide, tributyltin oxide, trichlamide, tricyclazole, tridemorph, trifloxystrobin, triflumizole, triforine, triticonazole, undecylenic acid, uniconazole, uniconazole-P, urea fungicides, validamycin, valinamide fungicides, vinclozolin, voriconazole, zarilamid, zinc naphthenate, zineb, ziram, and zoxamide.

An antimicrobial may be combined with a carrier molecule or compound that may assist in sublimation or evaporation, such as when exposed to low pressure.

At block 735, antimicrobial module 700 may close valve between antimicrobial delivery unit and manifold.

At block 740, antimicrobial module 700 may open valve between antimicrobial delivery unit and manifold, allowing antimicrobial in antimicrobial delivery unit, such as a dose of antimicrobial, to enter vacuum chamber.

At block 745, which may follow decision block 725, antimicrobial module 700 may open valves between chamber of interest, manifold, antimicrobial delivery unit, and a vent for antimicrobial delivery unit, such as vent 123B, via valve 110I. Thereby, atmospheric air may pass over a high surface area sachet, impregnated with antimicrobial, thereby introducing both O2 and sublimated or evaporated antimicrobial into the vacuum chamber of interest. Evaporation or sublimation of antimicrobial may be facilitated by the low pressure discussed herein (between 0 and 150 Torr or 0 and 200 mbar or below the vaporization pressure of the antimicrobial). Evaporation or sublimination of antimicrobial may be facilitated by sequencing the opening of the valves between chamber of interest, manifold, antimicrobial delivery unit, and vent for antimicrobial delivery unit, such that the antimicrobial is exposed to the low pressure discussed herein (between 0 and 150 Torr or 0 and 200 mbar or below the vaporization pressure of the antimicrobial) for a period of time before the vent valve is opened.

Upon occurrence of an interrupt or exit condition, antimicrobial delivery module 700 may proceed to done or return block 799. At done or return block 799, antimicrobial delivery module 700 may conclude or may return to another process.

Figure 8:
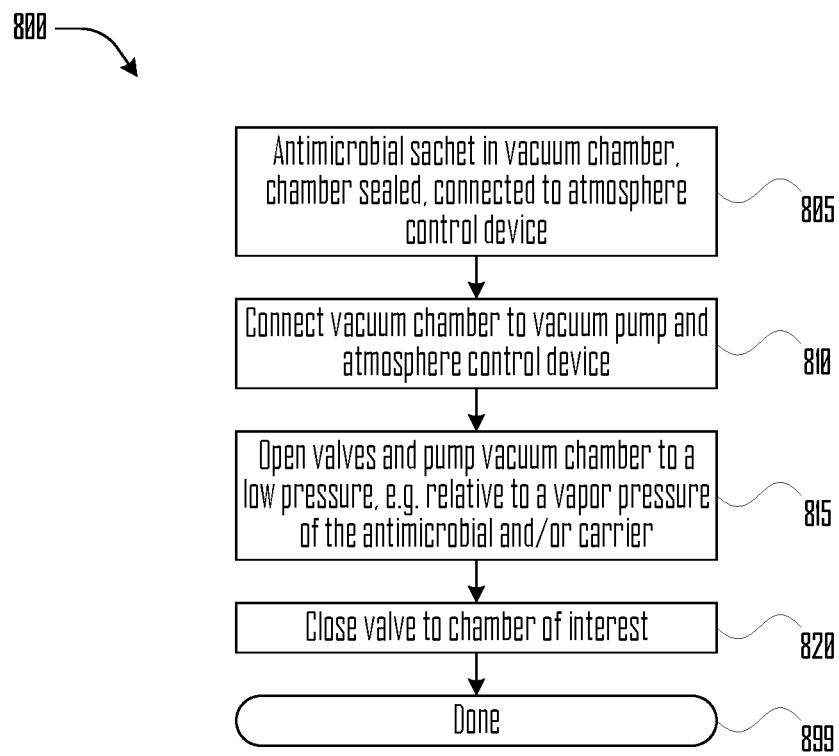
FIG. 8 illustrates example of a method performed by a second embodiment of an antimicrobial delivery module, according to some embodiments.

FIG. 8 is a flow diagram illustrating an example of a method performed by antimicrobial module-2 800, according to some embodiments. Antimicrobial module-2 800 may be performed by, for example, atmosphere control device(s), such as atmosphere control device 200, according to some embodiments. Components of antimicrobial module-2 800 may be performed by or with assistance from a hardware accelerator, such as hardware accelerator module 210.

Antimicrobial module-2 800 may be performed instead of or in addition to antimicrobial module 700.

At block 805, if not already performed by or in the course of performance of other modules, such as by perishable-container monitor module 400 and sample module 500, an antimicrobial sachet may have been placed in a vacuum chamber containing perishables. The antimicrobial sachet may contain a dose of antimicrobial, potentially in combination with a carrier. The dose may be an amount determined or intended to act as an antimicrobial during a transit or storage period. Presence of the sachet in the vacuum chamber may be recorded and noted by antimicrobial module-2 800, such as in or via one or more antimicrobial 320 and/or container 325 record. The vacuum chamber may also be loaded with perishables and sealed.

At block 810, if not already performed by or in the course of performance of other modules, such as by perishable-container monitor module 400 and sample module 500, the vacuum chamber containing the sachet may be connected to a vacuum pump, such as via vacuum tubes and the manifold, and to other components of atmosphere control device 200, such as control system 111. Connection to atmosphere control device 200 may be noted by antimicrobial module-2 800, for example, a container 325 and/or valve 320 record or the like.

At block 815, antimicrobial module-2 800 may open one or more valves with respect to vacuum tubes between the vacuum pump and the vacuum chamber, including via manifold. At block 815, antimicrobial module-2 800 may further draw a low pressure in the vacuum chamber with the vacuum pump. The low pressure may be between 0 and 150 Torr 0 and 200 mbar or below a vapor pressure of antimicrobial and/or below a vapor pressure of antimicrobial plus a carrier. The low pressure may cause antimicrobial and/or antimicrobial plus the carrier to sublimate and/or evaporate from the antimicrobial sachet in the vacuum chamber. A portion of the antimicrobial may adhere to perishables in the vacuum chamber; the antimicrobial may inhibit growth of pathogens and microbes in the vacuum chamber.

At block 820, antimicrobial module-2 800 may close valves or other closure mechanisms between the vacuum chamber and the vacuum pump, including with respect to manifold. Closure of the valves may isolate the vacuum chamber and the sublimated or evaporated antimicrobial from external air. The evacuated vacuum chamber may then be shipped. Before and/or during shipment, the evacuated vacuum chamber may also or alternatively be connected to control system 111, as discussed herein, and other modules may be executed with respect to the vacuum chamber, such as perishable-container monitor module 400, sample module 500, oxygenation module 600, antimicrobial module 700, and the like.

Upon occurrence of an interrupt or exit condition, antimicrobial module-2 800 may proceed to done or return block 899. At done or return block 899, antimicrobial module-2 800 may conclude or may return to another process.

Atmosphere control device 200 may be provided by a range of computational devices including one or more microprocessors, microcontrollers, an embedded computer system, a server, a workstation computer, a desktop computer, a laptop computer, a tablet computer (e.g., iPad®, GalaxyTab® and the like), an ultraportable computer, an ultramobile computer, a netbook computer and/or a subnotebook computer; a mobile telephone including, but not limited to a smart phone, (e.g., iPhone®, Android®-based phone, Blackberry®, Symbian®-based phone, Palm®-based phone, etc.).

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

Following are non-limiting examples:

Example 1

An apparatus to control a vacuum chamber for perishable commodities, comprising: a vacuum chamber to contain a perishable commodity in a low pressure atmosphere, an atmosphere control system coupled to the vacuum chamber, wherein the atmosphere control system comprises a vacuum pump, a sensor, a valve between the vacuum pump and the vacuum chamber, and a computer processor and a memory, and wherein the memory comprises a vacuum chamber control module to control the vacuum chamber; wherein to control the vacuum chamber, the vacuum chamber control module is to control the valve and the vacuum pump, sense with the sensor a condition of the low pressure atmosphere in the vacuum chamber, determine an objective for the low pressure atmosphere in the vacuum chamber, and influence the condition of the low pressure atmosphere toward the objective.

Example 2

The apparatus according to Example 1, wherein the sensor comprises at least one of an oxygen sensor, a carbon-dioxide sensor, a pressure sensor, and a temperature sensor and wherein the low pressure comprises a gas pressure within the vacuum chamber between 0 and 200 mbar.

Example 3

The apparatus according to Example 1, wherein the atmosphere control system further comprises a manifold between the vacuum pump and the vacuum chamber and wherein to sense with the sensor the condition of the low pressure atmosphere in the vacuum chamber, the vacuum chamber control module is further to sense the condition of an atmosphere in the manifold.

Example 4

The apparatus according to Example 3, wherein the valve is a first valve between the manifold and the vacuum pump and wherein the atmosphere control system further comprises a second valve between the vacuum chamber and the manifold, and wherein the vacuum chamber control module is further to close the second valve between the vacuum chamber and the manifold, open the first valve between the manifold and the vacuum pump, activate the vacuum pump to evacuate the manifold to a gas pressure below a gas pressure of the vacuum chamber, close the first valve between the manifold and the vacuum pump, open the second valve between the vacuum chamber and the manifold, allow the low pressure atmosphere in the vacuum chamber to equalize with the gas pressure below the gas pressure of the vacuum in the manifold, and sense the condition of the atmosphere in the manifold.

Example 5

The apparatus according to Example 3 or Example 4, wherein the vacuum chamber control module is further bring the atmosphere in the manifold to standard atmospheric pressure, sense the condition of the atmosphere in the manifold at standard atmospheric pressure and wherein to determine the condition of the low pressure atmosphere in the vacuum chamber, the vacuum chamber control module is further to compensate the sensed condition of the atmosphere in the manifold at standard atmospheric pressure based on having brough the manifold to standard atmospheric pressure.

Example 6

The apparatus according to Example 5, wherein the sensor is a carbon-dioxide sensor, wherein the carbon-dioxide sensor is unreliable at low pressure, and wherein to compensate the sensed condition of the atmosphere in the manifold at standard atmospheric pressure based on having brough the manifold to standard atmospheric pressure comprises to compensate the sensed condition of the atmosphere in the manifold at standard atmospheric pressure based on at least one of a volume of gas or a composition of gas introduced into the manifold to bring it to standard atmospheric pressure.

Example 7

The apparatus according to Example 1, wherein the objective is to attain an oxygen level in the vacuum chamber and wherein the vacuum chamber control module is further to introduce oxygen into the vacuum chamber.

Example 8

The apparatus according to Example 7, wherein the valve is a first valve between the vacuum chamber and the vacuum pump and wherein the atmosphere control system further comprises a second valve between the vacuum chamber and an oxygen source, and wherein to introduce oxygen into the vacuum chamber, the vacuum chamber control module is to open the first valve between the vacuum chamber and the vacuum pump, activate the vacuum pump to evacuate the vacuum chamber to a low pressure to remove buildup of volatile gases in the vacuum chamber, open the second valve between the oxygen source and the vacuum chamber to introduce oxygen into the vacuum chamber, close the second valve between the oxygen source and the vacuum chamber, and activate the vacuum pump to pump excess gas from the vacuum chamber.

Example 9

The apparatus according to Example 1, wherein the valve is a valve between the vacuum chamber and the vacuum pump, wherein the objective is to introduce a sublimated or evaporated antimicrobial into the vacuum chamber, wherein the vacuum chamber contains an antimicrobial sachet, and wherein to introduce the sublimated or evaporated antimicrobial into the vacuum chamber, the vacuum chamber control module is further to open the valve between the vacuum chamber and the vacuum pump, activate the vacuum pump to evacuate the vacuum chamber to a gas pressure below a vapor pressure of antimicrobial in the antimicrobial sachet and sublimate or evaporate the antimicrobial, and close the valve between the vacuum chamber and the vacuum pump.

Example 10

The apparatus according to Example 1, wherein the atmosphere control system further comprises a manifold between the vacuum chamber and the vacuum pump and an antimicrobial delivery chamber containing an antimicrobial to be sublimated or evaporated, wherein the objective is to introduce a sublimated or evaporated antimicrobial into the vacuum chamber, and wherein to introduce the sublimated or evaporated antimicrobial into the vacuum chamber, the vacuum chamber control module is further to expose the antimicrobial to be sublimated or evaporated in the antimicrobial delivery chamber to a pressure below a vaporization pressure of the antimicrobial to be sublimated or evaporated and thereby convert the antimicrobial to be sublimated or evaporated into the sublimated or evaporated antimicrobial, and is to introduce the sublimated or evaporated antimicrobial into the vacuum chamber.

Example 11

The apparatus according to Example 10, wherein the valve is a valve between an oxygen source and the antimicrobial delivery chamber and wherein to introduce the sublimated or evaporated antimicrobial into the vacuum chamber, the vacuum chamber control module is further to open the valve between the oxygen source and the antimicrobial delivery chamber and allow gas from the oxygen source to flow through the antimicrobial delivery chamber and carry the sublimated or evaporated antimicrobial and the gas from the oxygen source into the vacuum chamber.

Example 12

The apparatus according to Example 1, wherein the atmosphere control system further comprises a manifold between the vacuum chamber and the vacuum pump and an antimicrobial delivery chamber containing an antimicrobial to be sublimated or evaporated, wherein the valve is a first valve between the vacuum chamber and the manifold and wherein the atmosphere control system further comprises a second valve between the manifold and the antimicrobial delivery chamber and a third valve between the manifold and the vacuum pump, wherein the objective is to introduce a sublimated or evaporated antimicrobial into the vacuum chamber, and wherein to introduce the sublimated or evaporated antimicrobial into the vacuum chamber, the vacuum chamber control module is further to close the first valve between the vacuum chamber and the manifold, open the third valve between the manifold and the vacuum pump, activate the vacuum pump to evacuate the manifold to a pressure below a vaporization pressure of the antimicrobial to be sublimated or evaporated, close the third valve between the manifold and the vacuum pump, open the second valve between the manifold and the antimicrobial delivery chamber to expose the antimicrobial to be sublimated or evaporated to the pressure below the vaporization pressure of the antimicrobial to be sublimated or evaporated and to sublimate or evaporate the antimicrobial, close the second valve, and open the first valve between the vacuum chamber and the manifold to introduce the sublimated or evaporated antimicrobial into the vacuum chamber.

Example 13

A computer implemented method for controlling a vacuum chamber for perishable commodities, comprising: with a vacuum chamber to contain a perishable commodity in a low pressure atmosphere and an atmosphere control system coupled to the vacuum chamber, wherein the atmosphere control system comprises a vacuum pump, a sensor, a valve between the vacuum pump and the vacuum chamber, controlling the valve and the vacuum pump, sensing with the sensor a condition of the low pressure atmosphere in the vacuum chamber, determining an objective for the low pressure atmosphere in the vacuum chamber, and influencing the condition of the low pressure atmosphere toward the objective.

Example 14

The method according to Example 13, wherein the sensor comprises at least one of an oxygen sensor, a carbon-dioxide sensor, a pressure sensor, and a temperature sensor and wherein the low pressure comprises a gas pressure within the vacuum chamber between 0 and 200 mbar.

Example 15

The method according to Example 13, wherein the atmosphere control system further comprises a manifold between the vacuum pump and the vacuum chamber and wherein sensing with the sensor the condition of the low pressure atmosphere in the vacuum chamber comprises sensing the condition of an atmosphere in the manifold.

Example 16

The method according to Example 15, wherein the valve is a first valve between the manifold and the vacuum pump and wherein the atmosphere control system further comprises a second valve between the vacuum chamber and the manifold, and further comprising closing the second valve between the vacuum chamber and the manifold, opening the first valve between the manifold and the vacuum pump, activating the vacuum pump to evacuate the manifold to a gas pressure below a gas pressure of the vacuum chamber, closing the first valve between the manifold and the vacuum pump, opening the second valve between the vacuum chamber and the manifold, allowing the low pressure atmosphere in the vacuum chamber to equalize with the gas pressure below the gas pressure of the vacuum in the manifold, and sensing the condition of the atmosphere in the manifold.

Example 17

The method according to Example 15 or Example 16, and further comprising bringing the atmosphere in the manifold to standard atmospheric pressure, sensing the condition of the atmosphere in the manifold at standard atmospheric pressure and wherein determining the condition of the low pressure atmosphere in the vacuum chamber further comprises compensating the sensed condition of the atmosphere in the manifold at standard atmospheric pressure based on having brough the manifold to standard atmospheric pressure.

Example 18

The method according to Example 17, wherein the sensor is a carbon-dioxide sensor, wherein the carbon-dioxide sensor is unreliable at low pressure, and wherein compensating the sensed condition of the atmosphere in the manifold at standard atmospheric pressure based on having brough the manifold to standard atmospheric pressure comprises compensating the sensed condition of the atmosphere in the manifold at standard atmospheric pressure based on at least one of a volume of gas or a composition of gas introduced into the manifold to bring it to standard atmospheric pressure.

Example 19

The method according to Example 13, wherein the objective is to attain an oxygen level in the vacuum chamber and further comprising introducing oxygen into the vacuum chamber.

Example 20

The method according to Example 19, wherein the valve is a first valve between the vacuum chamber and the vacuum pump and wherein the atmosphere control system further comprises a second valve between the vacuum chamber and an oxygen source, and wherein introducing oxygen into the vacuum chamber comprises opening the first valve between the vacuum chamber and the vacuum pump, activating the vacuum pump to evacuate the vacuum chamber to a low pressure to remove buildup of volatile gases in the vacuum chamber, opening the second valve between the oxygen source and the vacuum chamber to introduce oxygen into the vacuum chamber, closing the second valve between the oxygen source and the vacuum chamber, and activating the vacuum pump to pump excess gas from the vacuum chamber.

Example 21

The method according to Example 13, wherein the valve is a valve between the vacuum chamber and the vacuum pump, wherein the objective is to introduce a sublimated or evaporated antimicrobial into the vacuum chamber, wherein the vacuum chamber contains an antimicrobial sachet, and wherein introducing the sublimated antimicrobial into the vacuum chamber comprises opening the valve between the vacuum chamber and the vacuum pump, activating the vacuum pump to evacuate the vacuum chamber to a gas pressure below a vapor pressure of antimicrobial in the antimicrobial sachet and sublimate or evaporate the antimicrobial, and closing the valve between the vacuum chamber and the vacuum pump.

Example 22

The method according to Example 13, wherein the atmosphere control system further comprises a manifold between the vacuum chamber and the vacuum pump and an antimicrobial delivery chamber containing an antimicrobial to be sublimated or evaporated, wherein the objective is to introduce a sublimated or evaporated antimicrobial into the vacuum chamber, and wherein introducing the sublimated or evaporated antimicrobial into the vacuum chamber comprises exposing the antimicrobial to be sublimated or evaporated in the antimicrobial delivery chamber to a pressure below a vaporization pressure of the antimicrobial to be sublimated or evaporated and thereby converting the antimicrobial to be sublimated or evaporated into the sublimated or evaporated antimicrobial, and introducing the sublimated or evaporated antimicrobial into the vacuum chamber.

Example 23

The method according to Example 22, wherein the valve is a valve between an oxygen source and the antimicrobial delivery chamber and wherein introducing the sublimated or evaporated antimicrobial into the vacuum chamber comprises opening the valve between the oxygen source and the antimicrobial delivery chamber and allowing gas from the oxygen source to flow through the antimicrobial delivery chamber and carry the sublimated or evaporated antimicrobial and the gas from the oxygen source into the vacuum chamber.

Example 24

The method according to Example 13, wherein the atmosphere control system further comprises a manifold between the vacuum chamber and the vacuum pump and an antimicrobial delivery chamber containing an antimicrobial to be sublimated or evaporated, wherein the valve is a first valve between the vacuum chamber and the manifold and wherein the atmosphere control system further comprises a second valve between the manifold and the antimicrobial delivery chamber and a third valve between the manifold and the vacuum pump, wherein the objective is to introduce a sublimated or evaporated antimicrobial into the vacuum chamber, and wherein introducing the sublimated or evaporated antimicrobial into the vacuum chamber comprises closing the first valve between the vacuum chamber and the manifold, opening the third valve between the manifold and the vacuum pump, activating the vacuum pump to evacuate the manifold to a pressure below a vaporization pressure of the antimicrobial to be sublimated or evaporated, closing the third valve between the manifold and the vacuum pump, opening the second valve between the manifold and the antimicrobial delivery chamber to expose the antimicrobial to be sublimated or evaporated to the pressure below the vaporization pressure of the antimicrobial to be sublimated or evaporated to sublimate or evaporate the antimicrobial, closing the second valve, and opening the first valve between the vacuum chamber and the manifold and introducing the sublimated or evaporated antimicrobial into the vacuum chamber.

Example 25

A computer apparatus controlling a vacuum chamber for perishable commodities, comprising: with a vacuum chamber to contain a perishable commodity in a low pressure atmosphere and an atmosphere control system coupled to the vacuum chamber, wherein the atmosphere control system comprises a vacuum pump, a sensor, a valve between the vacuum pump and the vacuum chamber, means to control the valve and the vacuum pump, sense with the sensor a condition of the low pressure atmosphere in the vacuum chamber, determine an objective for the low pressure atmosphere in the vacuum chamber, and influence the condition of the low pressure atmosphere toward the objective.

Example 26

The apparatus according to Example 25, wherein the sensor comprises at least one of an oxygen sensor, a carbon-dioxide sensor, a pressure sensor, and a temperature sensor and wherein the low pressure comprises a gas pressure within the vacuum chamber between 0 and 200 mbar.

Example 27

The apparatus according to Example 25, wherein the atmosphere control system further comprises a manifold between the vacuum pump and the vacuum chamber and wherein means to sense with the sensor the condition of the low pressure atmosphere in the vacuum chamber comprises means to sense the condition of an atmosphere in the manifold.

Example 28

The apparatus according to Example 27, wherein the valve is a first valve between the manifold and the vacuum pump and wherein the atmosphere control system further comprises a second valve between the vacuum chamber and the manifold, and further comprising means to close the second valve between the vacuum chamber and the manifold, open the first valve between the manifold and the vacuum pump, activate the vacuum pump to evacuate the manifold to a gas pressure below a gas pressure of the vacuum chamber, close the first valve between the manifold and the vacuum pump, open the second valve between the vacuum chamber and the manifold, allow the low pressure atmosphere in the vacuum chamber to equalize with the gas pressure below the gas pressure of the vacuum in the manifold, and sense the condition of the atmosphere in the manifold.

Example 29

The apparatus according to Example 27 or Example 28, further comprising means to bring the atmosphere in the manifold to standard atmospheric pressure, sense the condition of the atmosphere in the manifold at standard atmospheric pressure and wherein means to determine the condition of the low pressure atmosphere in the vacuum chamber further comprises means to compensate the sensed condition of the atmosphere in the manifold at standard atmospheric pressure based on having brough the manifold to standard atmospheric pressure.

Example 30

The apparatus according to Example 29, wherein the sensor is a carbon-dioxide sensor, wherein the carbon-dioxide sensor is unreliable at low pressure, and wherein means to compensate the sensed condition of the atmosphere in the manifold at standard atmospheric pressure based on having brough the manifold to standard atmospheric pressure comprises means to compensate the sensed condition of the atmosphere in the manifold at standard atmospheric pressure based on at least one of a volume of gas or a composition of gas introduced into the manifold to bring it to standard atmospheric pressure.

Example 31

The apparatus according to Example 25, wherein the objective is to attain an oxygen level in the vacuum chamber and further comprising means to introduce oxygen into the vacuum chamber.

Example 32

The apparatus according to Example 31, wherein the valve is a first valve between the vacuum chamber and the vacuum pump and wherein the atmosphere control system further comprises a second valve between the vacuum chamber and an oxygen source, and wherein means to introduce oxygen into the vacuum chamber comprises means to open the first valve between the vacuum chamber and the vacuum pump, activate the vacuum pump to evacuate the vacuum chamber to a low pressure to remove buildup of volatile gases in the vacuum chamber, open the second valve between the oxygen source and the vacuum chamber to introduce oxygen into the vacuum chamber, close the second valve between the oxygen source and the vacuum chamber, and activate the vacuum pump to pump excess gas from the vacuum chamber.

Example 33

The apparatus according to Example 25, wherein the valve is a valve between the vacuum chamber and the vacuum pump, wherein the objective is to introduce a sublimated or evaporated antimicrobial into the vacuum chamber, wherein the vacuum chamber contains an antimicrobial sachet, and wherein means to introduce the sublimated antimicrobial into the vacuum chamber comprises means to open the valve between the vacuum chamber and the vacuum pump, activate the vacuum pump to evacuate the vacuum chamber to a gas pressure below a vapor pressure of antimicrobial in the antimicrobial sachet and sublimate or evaporate the antimicrobial, and close the valve between the vacuum chamber and the vacuum pump.

Example 34

The apparatus according to Example 25, wherein the atmosphere control system further comprises a manifold between the vacuum chamber and the vacuum pump and an antimicrobial delivery chamber containing an antimicrobial to be sublimated or evaporated, wherein the objective is to introduce a sublimated or evaporated antimicrobial into the vacuum chamber, and wherein means to introduce the sublimated or evaporated antimicrobial into the vacuum chamber comprises means to expose the antimicrobial to be sublimated or evaporated in the antimicrobial delivery chamber to a pressure below a vaporization pressure of the antimicrobial to be sublimated or evaporated and thereby convert the antimicrobial to be sublimated or evaporated into the sublimated or evaporated antimicrobial, and introduce the sublimated or evaporated antimicrobial into the vacuum chamber.

Example 35

The apparatus according to Example 34, wherein the valve is a valve between an oxygen source and the antimicrobial delivery chamber and wherein means to introduce the sublimated or evaporated antimicrobial into the vacuum chamber comprises means to open the valve between the oxygen source and the antimicrobial delivery chamber and allow gas from the oxygen source to flow through the antimicrobial delivery chamber and carry the sublimated or evaporated antimicrobial and the gas from the oxygen source into the vacuum chamber.

Example 36

The apparatus according to Example 25, wherein the atmosphere control system further comprises a manifold between the vacuum chamber and the vacuum pump and an antimicrobial delivery chamber containing an antimicrobial to be sublimated or evaporated, wherein the valve is a first valve between the vacuum chamber and the manifold and wherein the atmosphere control system further comprises a second valve between the manifold and the antimicrobial delivery chamber and a third valve between the manifold and the vacuum pump, wherein the objective is to introduce a sublimated or evaporated antimicrobial into the vacuum chamber, and wherein means to introduce the sublimated or evaporated antimicrobial into the vacuum chamber comprises means to close the first valve between the vacuum chamber and the manifold, open the third valve between the manifold and the vacuum pump, activate the vacuum pump to evacuate the manifold to a pressure below a vaporization pressure of the antimicrobial to be sublimated or evaporated, close the third valve between the manifold and the vacuum pump, open the second valve between the manifold and the antimicrobial delivery chamber to expose the antimicrobial to be sublimated or evaporated to the pressure below the vaporization pressure of the antimicrobial to be sublimated or evaporated to sublimate or evaporate the antimicrobial, close the second valve, and open the first valve between the vacuum chamber and the manifold and introduce the sublimated or evaporated antimicrobial into the vacuum chamber.

Example 37

One or more computer-readable media comprising instructions that cause a computer device, in response to execution of the instructions by a processor of the computer device, to: with a vacuum chamber to contain a perishable commodity in a low pressure atmosphere and an atmosphere control system coupled to the vacuum chamber, wherein the atmosphere control system comprises a vacuum pump, a sensor, a valve between the vacuum pump and the vacuum chamber, control the valve and the vacuum pump, sense with the sensor a condition of the low pressure atmosphere in the vacuum chamber, determine an objective for the low pressure atmosphere in the vacuum chamber, and influence the condition of the low pressure atmosphere toward the objective.

Example 38

The computer-readable media according to Example 37, wherein the sensor comprises at least one of an oxygen sensor, a carbon-dioxide sensor, a pressure sensor, and a temperature sensor and wherein the low pressure comprises a gas pressure within the vacuum chamber between 0 and 200 mbar.

Example 39

The computer-readable media according to Example 37, wherein the atmosphere control system further comprises a manifold between the vacuum pump and the vacuum chamber and wherein sense with the sensor the condition of the low pressure atmosphere in the vacuum chamber comprises sense the condition of an atmosphere in the manifold.

Example 40

The computer-readable media according to Example 39, wherein the valve is a first valve between the manifold and the vacuum pump and wherein the atmosphere control system further comprises a second valve between the vacuum chamber and the manifold, and further comprising and wherein the computer-readable media further cause the computer device to close the second valve between the vacuum chamber and the manifold, open the first valve between the manifold and the vacuum pump, activate the vacuum pump to evacuate the manifold to a gas pressure below a gas pressure of the vacuum chamber, close the first valve between the manifold and the vacuum pump, open the second valve between the vacuum chamber and the manifold, allow the low pressure atmosphere in the vacuum chamber to equalize with the gas pressure below the gas pressure of the vacuum in the manifold, and sense the condition of the atmosphere in the manifold.

Example 41

The computer-readable media according to Example 39 or Example 40, wherein the computer-readable media further cause the computer device to bring the atmosphere in the manifold to standard atmospheric pressure, sense the condition of the atmosphere in the manifold at standard atmospheric pressure and wherein to determine the condition of the low pressure atmosphere in the vacuum chamber further comprises compensate the sensed condition of the atmosphere in the manifold at standard atmospheric pressure based on having brough the manifold to standard atmospheric pressure.

Example 42

The computer-readable media according to Example 42, wherein the sensor is a carbon-dioxide sensor, wherein the carbon-dioxide sensor is unreliable at low pressure, and wherein compensate the sensed condition of the atmosphere in the manifold at standard atmospheric pressure based on having brough the manifold to standard atmospheric pressure comprises the computer-readable media further causing the computer device to compensate the sensed condition of the atmosphere in the manifold at standard atmospheric pressure based on at least one of a volume of gas or a composition of gas introduced into the manifold to bring it to standard atmospheric pressure.

Example 43

The computer-readable media according to Example 37, wherein the objective is to attain an oxygen level in the vacuum chamber and wherein the computer-readable media further cause the computer device to introduce oxygen into the vacuum chamber.

Example 44

The computer-readable media according to Example 43, wherein the valve is a first valve between the vacuum chamber and the vacuum pump and wherein the atmosphere control system further comprises a second valve between the vacuum chamber and an oxygen source, and wherein to introduce oxygen into the vacuum chamber comprises the computer-readable media further causing the computer device to open the first valve between the vacuum chamber and the vacuum pump, activate the vacuum pump to evacuate the vacuum chamber to a low pressure to remove buildup of volatile gases in the vacuum chamber, open the second valve between the oxygen source and the vacuum chamber to introduce oxygen into the vacuum chamber, close the second valve between the oxygen source and the vacuum chamber, and activate the vacuum pump to pump excess gas from the vacuum chamber.

Example 45

The computer-readable media according to Example 37, wherein the valve is a valve between the vacuum chamber and the vacuum pump, wherein the objective is to introduce a sublimated or evaporated antimicrobial into the vacuum chamber, wherein the vacuum chamber contains an antimicrobial sachet, and wherein to introduce the sublimated antimicrobial into the vacuum chamber comprises the computer-readable media causing the computer device to open the valve between the vacuum chamber and the vacuum pump, activate the vacuum pump to evacuate the vacuum chamber to a gas pressure below a vapor pressure of antimicrobial in the antimicrobial sachet and sublimate or evaporate the antimicrobial, and close the valve between the vacuum chamber and the vacuum pump.

Example 46

The computer-readable media according to Example 37, wherein the atmosphere control system further comprises a manifold between the vacuum chamber and the vacuum pump and an antimicrobial delivery chamber containing an antimicrobial to be sublimated or evaporated, wherein the objective is to introduce a sublimated or evaporated antimicrobial into the vacuum chamber, and wherein to introduce the sublimated or evaporated antimicrobial into the vacuum chamber comprises the computer-readable media further causing the computer device to expose the antimicrobial to be sublimated or evaporated in the antimicrobial delivery chamber to a pressure below a vaporization pressure of the antimicrobial to be sublimated or evaporated and thereby convert the antimicrobial to be sublimated or evaporated into the sublimated or evaporated antimicrobial, and introduce the sublimated or evaporated antimicrobial into the vacuum chamber.

Example 47

The computer-readable media according to Example 46, wherein the valve is a valve between an oxygen source and the antimicrobial delivery chamber and wherein to introduce the sublimated or evaporated antimicrobial into the vacuum chamber comprises the computer-readable media further causing the computer device to open the valve between the oxygen source and the antimicrobial delivery chamber and allow gas from the oxygen source to flow through the antimicrobial delivery chamber and carry the sublimated or evaporated antimicrobial and the gas from the oxygen source into the vacuum chamber.

Example 48

The computer-readable media according to Example 37, wherein the atmosphere control system further comprises a manifold between the vacuum chamber and the vacuum pump and an antimicrobial delivery chamber containing an antimicrobial to be sublimated or evaporated, wherein the valve is a first valve between the vacuum chamber and the manifold and wherein the atmosphere control system further comprises a second valve between the manifold and the antimicrobial delivery chamber and a third valve between the manifold and the vacuum pump, wherein the objective is to introduce a sublimated or evaporated antimicrobial into the vacuum chamber, and wherein to introduce the sublimated or evaporated antimicrobial into the vacuum chamber comprises the computer-readable media further causing the computer device to close the first valve between the vacuum chamber and the manifold, open the third valve between the manifold and the vacuum pump, activate the vacuum pump to evacuate the manifold to a pressure below a vaporization pressure of the antimicrobial to be sublimated or evaporated, close the third valve between the manifold and the vacuum pump, open the second valve between the manifold and the antimicrobial delivery chamber to expose the antimicrobial to be sublimated or evaporated to the pressure below the vaporization pressure of the antimicrobial to be sublimated or evaporated to sublimate or evaporate the antimicrobial, close the second valve, and open the first valve between the vacuum chamber and the manifold and introduce the sublimated or evaporated antimicrobial into the vacuum chamber.

The invention claimed is:

1. An apparatus to control a vacuum chamber for perishable commodities, comprising: a vacuum chamber to contain a perishable commodity in a low pressure atmosphere and an atmosphere control system coupled to the vacuum chamber, wherein the atmosphere control system comprises a vacuum pump, a sensor, a valve between the vacuum pump and the vacuum chamber, and a computer processor and a memory, and wherein the memory comprises a vacuum chamber control module to control the vacuum chamber; wherein to control the vacuum chamber, the vacuum chamber control module is to control the valve and the vacuum pump, sense with the sensor a condition of the low pressure atmosphere in the vacuum chamber, determine an objective for the low pressure atmosphere in the vacuum chamber, and influence the condition of the low pressure atmosphere toward the objective, wherein the atmosphere control system further comprises a manifold between the vacuum pump and the vacuum chamber and wherein to sense with the sensor the condition of the low pressure atmosphere in the vacuum chamber, the vacuum chamber control module is further to sense the condition of an atmosphere in the manifold.

2. The apparatus according to claim 1, wherein the sensor comprises at least one of an oxygen sensor, a carbon-dioxide sensor, a pressure sensor, and a temperature sensor and wherein the low pressure comprises a gas pressure within the vacuum chamber between 0 and 200 mbar.

3. The apparatus according to claim 1, wherein the valve is a first valve between the manifold and the vacuum pump and wherein the atmosphere control system further comprises a second valve between the vacuum chamber and the manifold, and wherein the vacuum chamber control module is further to close the second valve between the vacuum chamber and the manifold, open the first valve between the manifold and the vacuum pump, activate the vacuum pump to evacuate the manifold to a gas pressure below a gas pressure of the vacuum chamber, close the first valve between the manifold and the vacuum pump, open the second valve between the vacuum chamber and the manifold, allow the low pressure atmosphere in the vacuum chamber to equalize with the gas pressure below the gas pressure of the vacuum in the manifold, and sense the condition of the atmosphere in the manifold.

4. The apparatus according to claim 1, wherein the vacuum chamber control module is further to bring the atmosphere in the manifold to standard atmospheric pressure, sense the condition of the atmosphere in the manifold at standard atmospheric pressure and wherein to determine the condition of the low pressure atmosphere in the vacuum chamber, the vacuum chamber control module is further to compensate the sensed condition of the atmosphere in the manifold at standard atmospheric pressure based on having brough the manifold to standard atmospheric pressure.

5. The apparatus according to claim 4, wherein the sensor is a carbon-dioxide sensor, wherein the carbon-dioxide sensor is unreliable at low pressure, and wherein to compensate the sensed condition of the atmosphere in the manifold at standard atmospheric pressure based on having brough the manifold to standard atmospheric pressure comprises to compensate the sensed condition of the atmosphere in the manifold at standard atmospheric pressure based on at least one of a volume of gas or a composition of gas introduced into the manifold to bring it to standard atmospheric pressure.

6. The apparatus according to claim 1, wherein the objective is to attain an oxygen level in the vacuum chamber and wherein the vacuum chamber control module is further to introduce oxygen into the vacuum chamber.

7. The apparatus according to claim 6, wherein the valve is a first valve between the vacuum chamber and the vacuum pump and wherein the atmosphere control system further comprises a second valve between the vacuum chamber and an oxygen source, and wherein to introduce oxygen into the vacuum chamber, the vacuum chamber control module is to open the first valve between the vacuum chamber and the vacuum pump, activate the vacuum pump to evacuate the vacuum chamber to a low pressure to remove buildup of volatile gases in the vacuum chamber, open the second valve between the oxygen source and the vacuum chamber to introduce oxygen into the vacuum chamber, close the second valve between the oxygen source and the vacuum chamber, and activate the vacuum pump to pump excess gas from the vacuum chamber.

8. The apparatus according to claim 1, wherein the valve is a valve between the vacuum chamber and the vacuum pump, wherein the objective is to introduce a sublimated or evaporated antimicrobial into the vacuum chamber, wherein the vacuum chamber contains an antimicrobial sachet, and wherein to introduce the sublimated or evaporated antimicrobial into the vacuum chamber, the vacuum chamber control module is further to open the valve between the vacuum chamber and the vacuum pump, activate the vacuum pump to evacuate the vacuum chamber to a gas pressure below a vapor pressure of antimicrobial in the antimicrobial sachet and sublimate or evaporate the antimicrobial, and close the valve between the vacuum chamber and the vacuum pump.

9. The apparatus according to claim 1, wherein the atmosphere control system further comprises a manifold between the vacuum chamber and the vacuum pump and an antimicrobial delivery chamber containing an antimicrobial to be sublimated or evaporated, wherein the objective is to introduce a sublimated or evaporated antimicrobial into the vacuum chamber, and wherein to introduce the sublimated or evaporated antimicrobial into the vacuum chamber, the vacuum chamber control module is further to expose the antimicrobial to be sublimated or evaporated in the antimicrobial delivery chamber to a pressure below a vaporization pressure of the antimicrobial to be sublimated or evaporated and thereby convert the antimicrobial to be sublimated or evaporated into the sublimated or evaporated antimicrobial, and is to introduce the sublimated or evaporated antimicrobial into the vacuum chamber.

10. The apparatus according to claim 9, wherein the valve is a valve between an oxygen source and the antimicrobial delivery chamber and wherein to introduce the sublimated or evaporated antimicrobial into the vacuum chamber, the vacuum chamber control module is further to open the valve between the oxygen source and the antimicrobial delivery chamber and allow gas from the oxygen source to flow through the antimicrobial delivery chamber and carry the sublimated or evaporated antimicrobial and the gas from the oxygen source into the vacuum chamber.

11. A computer apparatus controlling a vacuum chamber for perishable commodities, comprising: a vacuum chamber to contain a perishable commodity in a low pressure atmosphere and an atmosphere control system coupled to the vacuum chamber, wherein the atmosphere control system comprises a vacuum pump, a sensor, a valve between the vacuum pump and the vacuum chamber, means to control the valve and the vacuum pump, sense with the sensor a condition of the low pressure atmosphere in the vacuum chamber, determine an objective for the low pressure atmosphere in the vacuum chamber, and influence the condition of the low pressure atmosphere toward the objective, wherein the atmosphere control system further comprises a manifold between the vacuum pump and the vacuum chamber and wherein to sense with the sensor the condition of the low pressure atmosphere in the vacuum chamber, wherein the atmosphere control system further comprises a vacuum chamber control module configured to sense the condition of an atmosphere in the manifold.

* * * * *